(12) United States Patent
Mabuchi et al.

(10) Patent No.: US 8,184,461 B2
(45) Date of Patent: May 22, 2012

(54) POWER CONDITIONER AND SOLAR PHOTOVOLTAIC POWER GENERATION SYSTEM

(75) Inventors: Masao Mabuchi, Kyoto (JP); Yasuhiro Tsubota, Kyoto (JP); Takao Mizokami, Kyoto (JP); Hideaki Fujita, Tokyo (JP)

(73) Assignees: Omron Corporation, Kyoto (JP); Tokyo Institute of Technology, Tokyo (JP)

( * ) Notice: Subject to any disclaimer, the term of this patent is extended or adjusted under 35 U.S.C. 154(b) by 272 days.

(21) Appl. No.: 12/710,822

(22) Filed: Feb. 23, 2010

(65) Prior Publication Data

US 2010/0232191 A1    Sep. 16, 2010

(30) Foreign Application Priority Data

Mar. 13, 2009    (JP) .................................. 2009-061916

(51) Int. Cl.
*H02M 7/00* (2006.01)
*H02M 7/02* (2006.01)

(52) U.S. Cl. ......................................... 363/124; 363/65
(58) Field of Classification Search .................... 363/65, 363/71, 95, 97, 98, 123, 124, 131, 132, 133
See application file for complete search history.

(56) References Cited

U.S. PATENT DOCUMENTS

| | | | |
|---|---|---|---|
| 4,117,364 A | | 9/1978 | Baker |
| 5,430,639 A | * | 7/1995 | Takahashi ..................... 363/124 |
| 6,556,461 B1 | | 4/2003 | Khersonsky et al. |
| 7,692,938 B2 | * | 4/2010 | Petter ............................ 323/361 |
| 2002/0118559 A1 | * | 8/2002 | Kurokami et al. ............. 363/131 |

(Continued)

FOREIGN PATENT DOCUMENTS

DE    10 2005 040 543 A1    3/2007
(Continued)

OTHER PUBLICATIONS

European Patent Office extended European search report on Application No. 101546281.1 dated Aug. 30, 2010; 7 pages.
Calais, Martina, et al.; Multilevel Converters for Single-phase Grid Connected Photovoltaic Systems: An Overview; Oct. 9, 1998; Solar Energy, vol. 66, No. 5, pp. 325-335.

*Primary Examiner* — Adolf Berhane
*Assistant Examiner* — Jeffrey Gblende
(74) *Attorney, Agent, or Firm* — Foley & Lardner LLP

(57) ABSTRACT

A first circuit generates a first sequence of square wave voltages having a voltage level that changes to a positive side relative to a first reference potential, which is a potential on a negative-electrode side of a direct current power source, from a direct current voltage. A second circuit generates a second sequence of square wave voltages having a voltage level lower than the voltage level of the first sequence of square wave voltages on the positive side that changes to a negative side relative to a second reference potential. The second chopper circuit further generates a third sequence of square wave voltages having a voltage level that changes to the positive and negative side in turns in the manner of sinusoidal wave relative to the first reference potential by summing the first sequence of square wave voltages and the second sequence of square wave voltages. A third circuit outputs the third sequence of square wave voltages as a charge/discharge output. The third circuit further PWM-controls the charge/discharge output so that a difference of the third sequence of square wave voltages to a sinusoidal wave voltage is corrected and thereby generates a sinusoidal wave voltage that continuously changes to the positive and negative sides relative to the first reference potential from the third sequence of square wave voltages and the PWM-controlled output, and outputs the generated sinusoidal wave voltage to a load.

8 Claims, 19 Drawing Sheets

U.S. PATENT DOCUMENTS

| | | | |
|---|---|---|---|
| 2005/0030683 A1* | 2/2005 | Tailliet | 361/18 |
| 2007/0047277 A1 | 3/2007 | Konishi et al. | |
| 2008/0101101 A1* | 5/2008 | Iwata et al. | 363/71 |
| 2008/0232145 A1 | 9/2008 | Hiller et al. | |
| 2011/0278935 A1* | 11/2011 | Gurunathan et al. | 307/77 |

FOREIGN PATENT DOCUMENTS

| | | |
|---|---|---|
| JP | 2002-010496 | 1/2002 |
| JP | 2007-068385 | 3/2007 |
| WO | WO 02/063758 A1 | 8/2002 |

* cited by examiner

F I G. 5
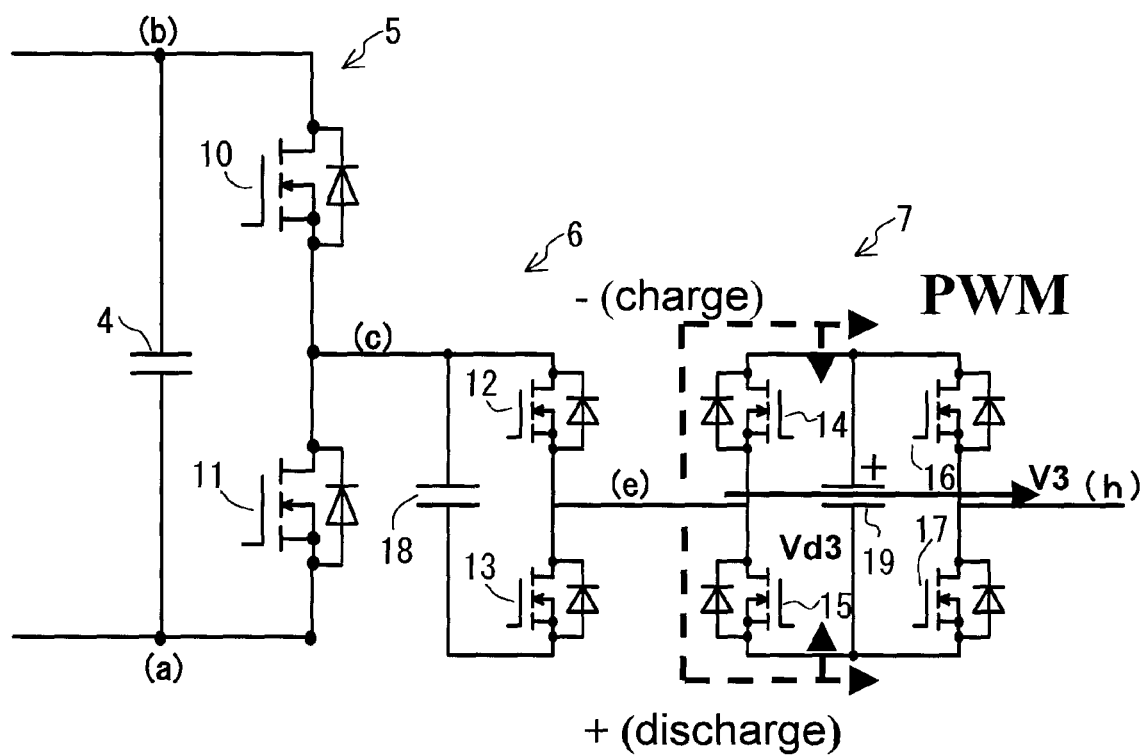

F I G. 1 3
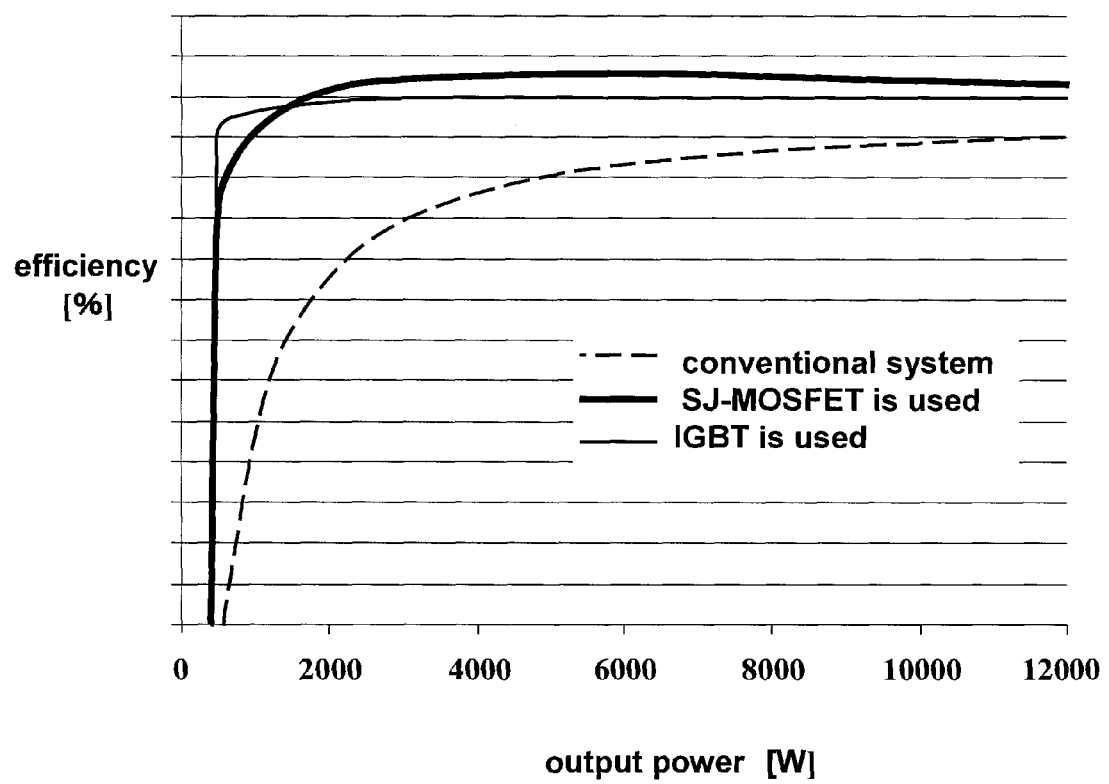

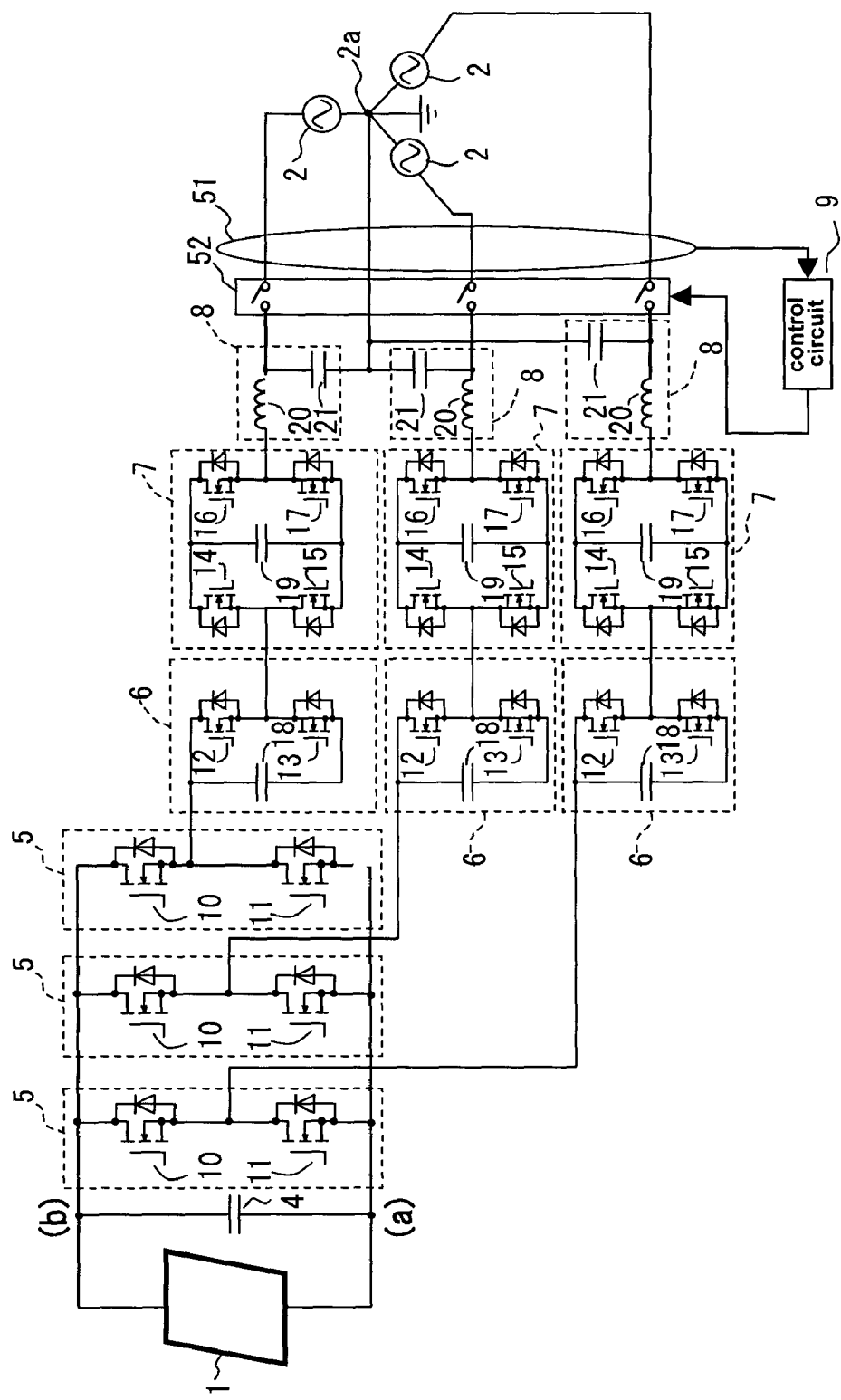
F I G. 1 9

POWER CONDITIONER AND SOLAR PHOTOVOLTAIC POWER GENERATION SYSTEM

CROSS-REFERENCE TO RELATED APPLICATION

This application claims the benefit and priority of Japanese Patent Application No. 2009-061916 filed Mar. 13, 2009. The foregoing application is incorporated by reference herein in its entirety.

BACKGROUND OF THE INVENTION

1. Field of the Invention

The present invention relates to a power conditioner for converting a direct current power generated by direct current power sources, such as a thin film solar cell and a fuel cell, into an alternating current power for utility interconnection, and a solar photovoltaic power generation system in which the power conditioner is used.

2. Description of the Related Art

In perspective of global environment protection, there are proactively ongoing projects in recent years for developing a power generation system using a solar cell attracting attention as an inexhaustible clean energy. In an example of the power generation system, a direct current power generated by the solar cell is converted by a power conditioner into an alternating current power having a commercial frequency for utility interconnection so that the converted alternating current power is supplied to a household load connected to a commercial power system, and surplus power, if the alternating current power exceeds power consumption by the household load, is returned to the system as a reverse power flow.

The power conditioner used in the solar photovoltaic power generation system conventionally includes an inverter for converting the direct current power generated by the solar cell into the alternating current, and a protection device for utility interconnection. There are two types of devices as such a power conditioner; an insulator device wherein a direct current unit and an alternating current unit are electrically insulated from each other by an insulation transformer, and a non-insulated type device wherein the insulation transformer is not used. Comparing these two different devices, the latter non-insulated type device, which is more advantageous in its power conversion efficiency, is more often used. An example of the latter device is recited in Japanese Patent Cited Document 1 (Unexamined Japanese Patent Publication No. 2002-10496).

FIG. 20 illustrates an example of a solar photovoltaic power generation system provided with a non-insulated type power conditioner. A power conditioner 36 illustrated in the drawing is operable for utility interconnection with a commercial power source 2. The power conditioner 36 is provided with a smoothing capacitor 33 for smoothing power generated by and outputted from a solar photovoltaic panel 1, an inverter 34 for PWM control, a filter 35 having a reactor and a capacitor, and a control circuit not shown.

In the power conditioner 36, the generated power outputted from the solar photovoltaic panel 1 is smoothed by the smoothing capacitor 33. The inverter 34 has switching elements 37-40, which are, for example, four MOSFET where diodes are connected in reverse parallel to each other. The power conditioner 36 controls a switching operation of the switching elements 37-40 in the inverter 34 (the switching elements are switched on and off) at such a high frequency as around 18 kHz to thereby convert the generated power of the solar photovoltaic panel 1 smoothed by the smoothing capacitor 33 into an alternating current power synchronizing with a commercial power system and outputs the converted power. The power conditioner 36 supplies the alternating current power thus converted by way of the filter 35 to a load not shown or supplies it to the system as a reverse power flow. A solar cell dominantly used in the solar photovoltaic panel 1 today is a crystalline solar cell superior in its power conversion efficiency.

Another example of the solar cell increasingly often used is an inexpensive thin film solar cell advantageous in that a significantly reduced volume of silicon to be used as its material, its simplified production process, enabling the production of a solar photovoltaic panel having a larger area. A known disadvantage of the thin film solar cell made of amorphous silicon is that a potential on a negative-electrode side thereof is possibly lower than a ground potential, which expedites aging degradation.

To avoid the aging degradation of the thin film solar cell, it is necessary to adjust its potential on the negative-electrode side to be equal to the ground potential. An insulator power conditioner, wherein a direct current unit and an alternating current unit are electrically insulated from each other by an insulation transformer, can set the potential on the negative-electrode side of the solar cell, which is the direct-current side, to the ground potential.

As opposed to the insulator power conditioner, a non-insulated type power conditioner 36 illustrated in FIG. 20 excellent in its power conversion efficiency, however, has the problem to be solved, that is failure to keep the potential on the negative-electrode side, which is an input side of the power conditioner 36, at the ground potential level because different reference potentials are used on the direct-current side and the alternating-current side.

In direct current power sources other than the solar cell, such as a fuel cell and a power generator, it is desirable to ground their negative-electrode side in view of better safety for such an event as electrical leak. The conventional non-insulated type power conditioner had difficulty in keeping the potential on the negative-electrode side of the direct current power source at a potential level equal to a ground potential of an alternating-current output.

SUMMARY OF THE INVENTION

The present invention was carried out to solve the conventional problem, and a main object thereof is to provide a non-insulated type power conditioner capable of retaining a potential on a negative-electrode side of a direct current power source at a potential level equal to a ground potential of an alternating current power source, and a solar photovoltaic power generation system in which the power conditioner is used.

1) A power conditioner according to the present invention is a non-insulated type power conditioner provided between a direct current power source and a commercial power source for converting a direct current input from the direct current power source into an alternating current output for utility interconnection with the commercial power source and outputting the conversion result, comprising, a circuit for retaining a potential on a negative-electrode side of the direct current output at a potential level equivalent to or higher than a ground potential of the alternating current output, wherein the circuit comprises:

a first circuit for chopping a direct current voltage from the direct current power source at a first frequency as a system frequency and thereby generating a first sequence of square wave voltages including a plurality of square wave voltages having a voltage level that changes to a positive side relative to a first reference potential as a potential on the negative-electrode side of the direct current power source;

a second circuit for using a potential of the first sequence of square wave voltages as a second reference potential, the second circuit chopping an output of the first circuit at a second frequency a predetermined number of times as high as the first frequency and thereby generating a second sequence of square wave voltages including a plurality of square wave voltages having a voltage level lower than the voltage level of the first sequence of square wave voltages on the positive side that changes to a negative side relative to the second reference potential, the second circuit further summing the first and second sequences of square wave voltages and thereby generating a third sequence of square wave voltages including a plurality of square wave voltages having a voltage level that changes to the positive and negative sides in turns in the manner of sinusoidal wave relative to the first reference potential; and a third circuit for chopping the third sequence of square wave voltages at a third frequency determined by a timing that depends on if a voltage difference thereof to a sinusoidal wave voltage results in a positive value or a negative value and outputting the chopped third sequence of square wave voltages as a charge/discharge output, the third circuit further PWM-controlling the charge/discharge output at a PWM frequency higher than the third frequency so that the voltage difference between the third sequence of square wave voltages and the sinusoidal wave voltage is corrected and thereby generating the sinusoidal wave voltage that continuously changes to the positive and negative sides relative to the first reference potential using the third sequence of square wave voltages and the PWM-controlled output, and outputting the generated sinusoidal wave voltage to a load.

The direct current power source denotes any of power sources for generating a direct current power such as a solar cell, a fuel cell, a wind power generator and a power generator. It is included in "the potential equivalent to the ground potential" that the negative-electrode side of the direct current input is directly grounded, and the negative-electrode side of the direct current input is not directly ground but its potential substantially is adjusted to be equal to the ground potential at the circuits.

The square wave does not necessarily have perfect rising and falling waveforms and may include more or less bluntness resulting from the charge/discharge in the rising and falling waveforms. It is meant by "changes to positive and negative sides in turns in the manner of sinusoidal wave" that the square wave voltage on the positive side (one side) and the square wave voltage on the negative side (the other side) relative to a reference potential are alternately generated at given periodic intervals. Preferably, the square wave and sinusoidal wave appear at equal periodic intervals. The sinusoidal wave voltage used to obtain the voltage difference to the sequence of square wave voltages is preferably a target sinusoidal wave voltage for the power conversion, more precisely, a target value of the sinusoidal wave voltage (command value) is preferably used.

The non-insulated type power conditioner according to the present invention comprises the circuit for retaining the potential on the negative-electrode side of the direct current output at a potential level equivalent to or higher than the ground potential of the alternating current output. Therefore, the potential on the negative-electrode side of the direct current power source can be retained at a potential level equivalent to the ground potential by the non-insulated type power conditioner. When the potential on the negative-electrode side of the direct current power source is thus substantially equal to the ground potential of the alternating current output, safety in such an event as electrical leak can be ensured. When a thin film solar cell is used in the direct current power source, aging degradation can be prevented from happening by keeping a potential on the negative-electrode side of the thin film solar cell at a potential level equivalent to or higher than the ground potential.

In the power conditioner according to the present invention, the first circuit and the second circuit are used to generate the third sequence of square wave voltages that changes to the positive and negative sides in turns in the manner of sinusoidal wave relative to the potential on the negative-electrode side of the direct current power source as the first reference potential, and also generate the sinusoidal wave voltage that continuously changes to the positive and negative sides relative to the potential on the negative-electrode side of the direct current power source using the third sequence of square wave voltages. Therefore, the potential on the negative-electrode side of the direct current power source can be equal to a zero potential of the sinusoidal wave voltage. As a result, in the non-insulated type power conditioner where no insulation transformer is used, the potential on the negative-electrode side of the direct current power source can be favorably adjusted to be equivalent to the ground potential.

Another advantage is that the chopping frequencies of the first-third circuits, in other words, switching frequencies of switching elements, are favorably far below that of a conventional PWM-control inverter for generating a sequence of square wave voltages including a large number of voltages in a positive or negative half cycle of the sinusoidal wave. As a result, switching less can be lessened, and switching elements with less conduction loss can be selected as the switching elements.

The third circuit PWM-controls the voltage difference between the sinusoidal wave voltage and the third sequence of square wave voltages that changes to the positive and negative sides in turns in the manner of sinusoidal wave. Therefore, the voltage lower than that of the conventional PWM-control inverter is necessary for the switching operation, resulting in the reduction of the switching loss. As a result, a power conversion efficiency can be improved as compared with the conventional inverter.

2) In the power conditioner according to a preferred mode of the present invention, the negative-electrode side of the direct current power source as a direct-current side is grounded.

According to the preferred mode, the first and second circuits are used to generate the third sequence of square wave voltages that changes to the positive and negative sides in turns in the manner of sinusoidal wave relative to the potential on the negative-electrode side of the direct current power source as the first reference potential. Then, the third circuit generates the sinusoidal wave voltage that continuously changes to the positive and negative sides relative to the potential on the negative-electrode side of the direct current power source using the third sequence of square wave voltages. Therefore, the potential on the negative-electrode side of the direct current power source can be equal to the zero potential of the sinusoidal wave voltage.

As a result, the negative-electrode side of the direct current power source can be grounded by the non-insulated type power conditioner according to the preferred mode where no insulation transformer is used. Accordingly, safety in such an event as electrical leak can be ensured. A thin film solar cell, which may be used in the direct current power source, can deter aging degradation resulting from its potential on the negative-electrode side lower than the ground potential.

3) In the power conditioner according to another preferred mode of the present invention, the commercial power source comprises a grounded wiring, and the first circuit, the second circuit and the third circuit are disposed between the direct current input and the commercial power source.

Examples of the commercial power source comprising such a grounded wiring are a Y connection three-phase commercial power source and a delta connection three-phase commercial power source where a neutral point is grounded, and a single-phase three-phase commercial power source and a single-phase commercial power source where a wiring is grounded.

According to the another preferred embodiment, the power conditioner is operable for utility interconnection with variously different commercial power sources having a grounded wiring.

4) In the power conditioner according to still another preferred mode of the present invention, the commercial power source is a Y connection three-phase commercial power source where a neutral point is grounded, the power conditioner converts the direct current input from the direct current power source into a three-phase alternating current power for utility interconnection with phases of the Y connection three-phase commercial power source, and outputs the converted three-phase alternating current power as the alternating current output, and the negative-electrode side of the direct current power source as the direct-current side is connected to the neutral point of the Y connection three-phase commercial power source as an alternating current side to be grounded.

According to the still another preferred embodiment, the third sequence of square wave voltages that changes to the positive and negative sides in turns in the manner of sinusoidal wave relative to the potential on the negative-electrode side of the direct current power source is generated. Then, the third sequence of square wave voltages is used to generate the sinusoidal wave voltage that continuously changes to the positive and negative sides relative to the potential on the negative-electrode side of the direct current power source. Therefore, the potential on the negative-electrode side of the direct current power source can be equal to the zero potential of the sinusoidal wave voltage. As a result, the negative-electrode side of the direct current power source as the direct-current side can be grounded by the non-insulated type power conditioner where no insulation transformer is used.

Accordingly, better safety can be provided in such an event as electrical leak. Using a thin film solar cell in the direct current power source, therefore, the occurrence of aging degradation, which results from the potential on the negative-electrode side of the thin film solar cell lower than the ground potential, can be avoided.

In the case where the negative-electrode side of the direct current power source and the neutral point of the Y connection three-phase commercial power source are both grounded, the flow of a ground fault current diverges in two directions, wiring and ground, leading to malfunctioning of a ground fault detecting feature. According to the still another preferred embodiment technically advantageous in that the negative-electrode side of the direct current power source is not directly grounded but is connected to the neutral point of the Y connection three-phase commercial power source to be indirectly grounded via the neutral point, the ground fault detecting feature can exert an expected performance. This distinct structure enables the ground fault detecting feature to detect the ground fault current and protectively shutdown the electric circuits if an operator, for example, accidentally contacts a positive-electrode side of the direct current input. As a result, the operator can be protected from an electrical shock.

The power conditioner according to the still another preferred mode may further comprise an electrical leak detecting circuit for detecting electrical leak, and a shutdown circuit for shutting down the electrical leak detected by the electrical leak detecting circuit. With these structural elements further provided, the ground fault detecting feature can exert an expected performance because the negative-electrode side of the direct current power source is not directly grounded but is connected to the neutral point of the Y connection three-phase commercial power source and then indirectly grounded via the neutral point. This distinct structure enables the ground fault detecting feature to detect the ground fault current and protectively shutdown the electric circuits if the operator accidentally contacts the positive-electrode side of the direct current input. As a result, the operator can be protected from an electrical shock.

5) In the power conditioner according to still another preferred mode of the present invention, the negative-electrode side of the direct current power source as the direct-current side is directly grounded.

According to the present invention, the third sequence of square wave voltages that changes to the positive and negative sides in turns in the manner of sinusoidal wave relative to the potential on the negative-electrode side of the direct current power source is generated. Then, the third sequence of square wave voltages is used to generate the sinusoidal wave voltage that continuously changes to the positive and negative sides relative to the potential on the negative-electrode side of the direct current power source. Therefore, the potential on the negative-electrode side of the direct current power source can be equal to the zero potential of the sinusoidal wave voltage.

In the non-insulated type power conditioner according to the still another preferred mode of the present invention wherein no insulation transformer is used, the negative-electrode side of the direct current power source as the direct-current side can be grounded. As a result, safety in the occurrence of electrical leak can be improved. Using a thin film solar cell in the direct current power source, therefore, the occurrence of aging degradation, which results from the potential on the negative-electrode side of the thin film solar cell lower than the ground potential, can be avoided.

The negative-electrode side of the direct current power source as the direct-current side and a wiring of the commercial power source are respectively grounded, whereas it is unnecessary to connect the negative-electrode side to the grounded wiring. This prevents high harmonics such as third-order harmonics, if generated in the wiring due to, for example, distortion of a system voltage, from running through the internal circuits of the power conditioner, thereby avoiding breakage of the internal circuits by the high harmonics.

6) In the power conditioner according to still another preferred mode of the present invention, the commercial power source is a Y connection three-phase commercial power source where a neutral point is grounded, the power conditioner converts the direct current input from the direct current power source into a three-phase alternating current power for utility interconnection with phases of the Y connection three-phase commercial power source, and outputs the converted three-phase alternating current power as the alternating current output, the first circuit, the second circuit and the third circuit are disposed between the direct current input and the Y connection three-phase commercial power source, and the potential on the negative-electrode side of the direct current power source as the direct-current side is equal to the ground potential.

According to the still another preferred embodiment, the third sequence of square wave voltages that changes to the positive and negative sides in turns in the manner of sinusoidal wave relative to the potential on the negative-electrode side of the direct current power source is generated. Then, the sinusoidal wave voltage that continuously changes to the positive and negative sides relative to the potential on the negative-electrode side of the direct current power source is generated from the third sequence of square wave voltages. Therefore, the potential on the negative-electrode side of the direct current power source can be equal to the zero potential of the sinusoidal wave voltage. As a result, the negative-electrode side of the direct current power source as the direct-current side can be grounded by the non-insulated type power conditioner where no insulation transformer is used.

As a result, safety in the occurrence of electrical leak can be improved. Using a thin film solar cell in the direct current power source, therefore, the occurrence of possible aging degradation, which results from the potential on the negative-electrode side of the thin film solar cell lower than the ground potential, can be avoided.

The negative-electrode side of the direct current power source, though not directly ground, consequently has a potential substantially equal to the potential at the neutral point where the phases of the Y connection three-phase commercial power source are well-balanced. The negative-electrode side of the direct current power source is, therefore, practically grounded, and the ground fault detecting feature can function well because it becomes unnecessary to directly ground the negative-electrode side of the direct current power source. This distinct structure enables the ground fault detecting feature to detect the ground fault current and protectively shutdown the electric circuits when the operator accidentally contacts the positive-electrode side of the direct current input. As a result, the operator can be protected from an electrical shock.

It is unnecessary to connect the negative-electrode side of the direct current power source to the wiring o the Y connection three-phase commercial power source. This distinct structure can prevent high harmonics such as third-order harmonics, if generated in the wiring due to the system voltage distortion, from running through the internal circuits of the power conditioner, thereby avoiding breakage of the internal circuits by the high harmonics.

7) In the power conditioner according to still another preferred mode of the present invention, the first circuit includes a first switching circuit having first and second two switching elements connected in series to each other, the first switching circuit is connected in parallel to a first capacitor connected to between positive and negative electrodes of the direct current power source, the first and second switching elements are switched on and off in turns at the first frequency, the second circuit includes a parallel connection circuit having a second capacitor and a second switching circuit, one parallel connection side of the parallel connection circuit is connected to a connecting portion where the first and second switching elements are serially connected to each other, the second switching circuit has third and fourth two switching elements connected in series to each other, the third and fourth switching elements are switched on and off in turns at the second frequency, the third circuit includes a parallel connection circuit having a third capacitor and a third switching circuit and a fourth switching circuit connected in parallel to the parallel connection circuit, the third switching circuit has fifth and sixth two switching elements connected in series to each other, a connecting portion where the fifth and sixth switching elements are serially connected to each other is connected to a connecting portion where the third and fourth switching elements are serially connected to each other, the fifth and sixth switching elements are switched on and off in turns at the third frequency, the fourth switching circuit has seventh and eighth two switching elements connected in series to each other, and the seventh and eighth switching elements are PWM-controlled at the PWM frequency higher than the third frequency.

According to the still another preferred mode, the first circuit generates the first sequence of square wave voltages that changes to the positive side relative to the first reference potential which is the potential on the negative-electrode side of the direct current power source. The second circuit generates the second sequence of square wave voltages that changes to the negative side relative to the second reference potential which is the potential of the first sequence of square wave voltages. The second circuit further generates the third sequence of square wave voltages that changes to the positive and negative sides in turns relative to the first reference potential in the manner of sinusoidal wave by summing the first and second sequences of square wave voltages. The third circuits generates the sinusoidal wave voltage that continuously changes to the positive and negative sides relative to the first reference potential from the third sequence of square wave voltages. Therefore, the potential on the negative-electrode side of the direct current power source can be equal to the zero potential of the sinusoidal wave voltage. As a result, the negative-electrode side of the direct current power source as the direct-current side can be grounded by the non-insulated type power conditioner where no insulation transformer is used.

8) A solar photovoltaic power generation system according to the present invention comprises:

a thin film solar cell as the direct current power source; and the power conditioner recited in the preferred mode 2).

According to the power generation system wherein the power conditioner according to one of the preferred modes is used, the negative-electrode side of the direct current power source as the direct-current side can be grounded by the non-insulated type power conditioner where no insulation transformer is used. Therefore, the occurrence of possible aging degradation, which results from the potential on the negative-electrode side of the thin film solar cell lower than the ground potential, can be avoided.

The power conversion efficiency of the power conditioner can be higher than that of the conventional power conditioner. As a result, the power generation system per se can increase its power efficiency.

According to the preferred modes described so far, the potential on the negative-electrode side of the direct current output can be retained at a potential level equivalent to the ground potential by the non-insulated type power conditioner. When the potential on the negative-electrode side of the direct current power source is thus substantially equal to the ground potential of the alternating current output, safety in such an event as electrical leak can be improved. When a thin film solar cell is used in the direct current power source, aging degradation can be prevented from happening by keeping the potential on the negative-electrode side of the thin film solar cell at a potential level equivalent to or higher than the ground potential.

According to the preferred modes described so far, safety in the occurrence of electrical leak can be improved. A thin film solar cell, which may be used in the direct current power source, can deter aging degradation resulting from its potential on the negative-electrode side lower than the ground potential

BRIEF DESCRIPTION OF THE DRAWINGS

These and other objects as well as advantages of the invention will become clear by the following description of preferred embodiments of the invention. A number of benefits not recited in this specification will come to the attention of the skilled in the art upon the implementation of the present invention.

FIG. 5 is an illustration referred to in the description of a theory of operation of a third chopper circuit illustrated in FIG. 1.

FIG. 13 is a graph illustrating characteristics according to the preferred embodiment and characteristics of a conventional system.

FIG. 19 is a drawing illustrating still another preferred embodiment of the present invention

DETAILED DESCRIPTION OF THE INVENTION

Preferred Embodiment 1

Figure 1:
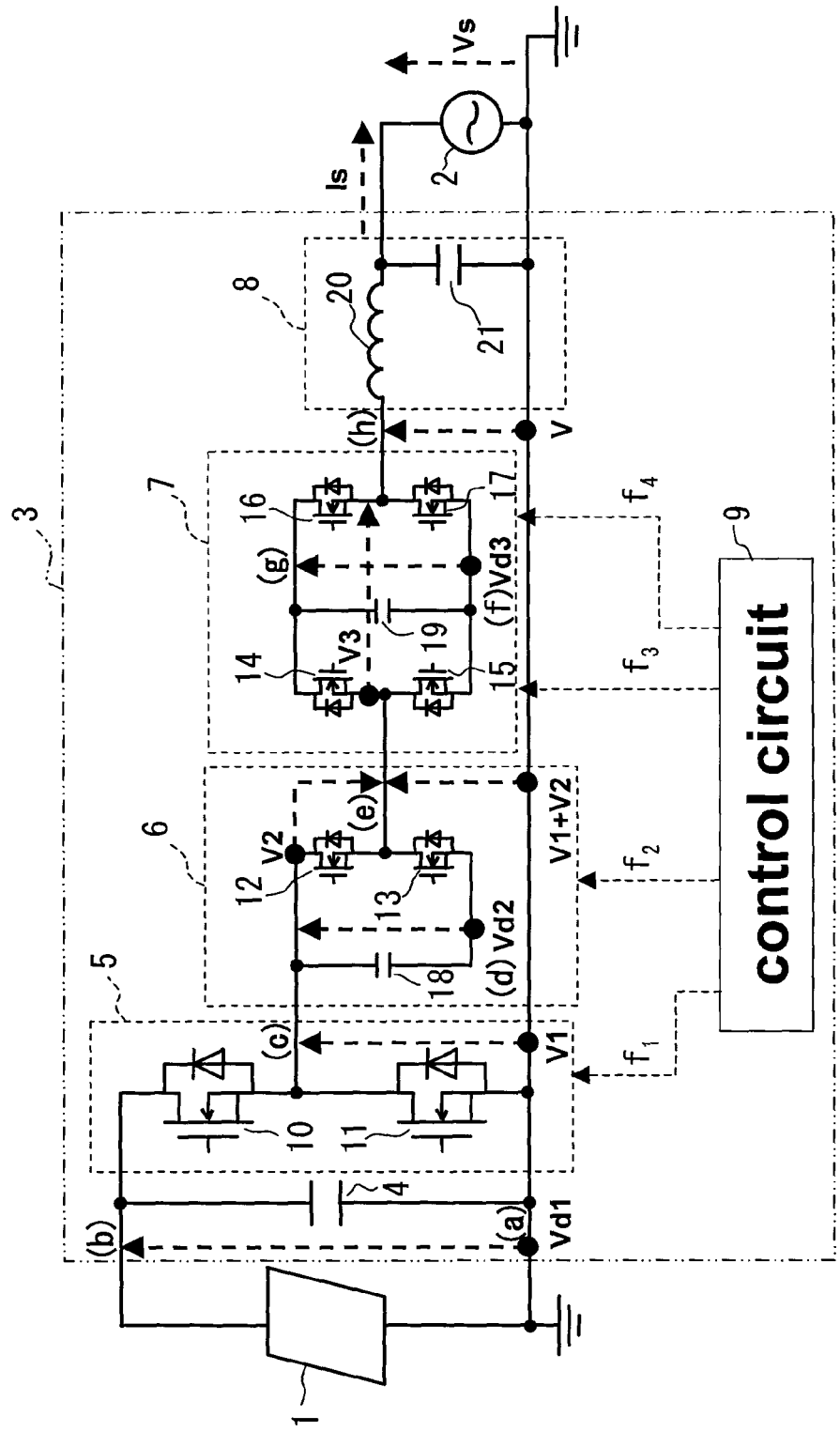
FIG. 1 is a drawing illustrating a solar photovoltaic power generation system according to a preferred embodiment of the present invention.

FIG. 1 is an illustration of a solar photovoltaic power generation system of a single-phase two-wire structure according to a preferred embodiment of the present invention. The solar photovoltaic power generation system according to the present preferred embodiment is provided with a solar photovoltaic panel 1, and a power conditioner 3, operable for utility interconnection with a commercial power source 2, for converting a direct current power from the solar photovoltaic panel 1 into an alternating current power.

The solar photovoltaic panel 1 has a plurality of solar photovoltaic modules connected in series or in parallel to each other so that a required power is generated. Very thin solar cells made of amorphous silicon constitute the solar photovoltaic panel 1 according to the present preferred embodiment. The power conditioner 3 according to the present preferred embodiment is a non-insulated type power conditioner not provided with an insulation transformer. The power conditioner 3 comprises a first capacitor 4 serving as a smoothing capacitor, first-third chopper circuits 5-7, a noise filter 8, and a control circuit 9 for controlling the chopper circuits 5-7 by measuring voltages of the respective structural elements. The first-third chopper circuits 5-7 and the control circuit 9 constitute a chopper converter cascade-connected to the solar photovoltaic panel 1. A negative-electrode side of the solar photovoltaic panel 1 is grounded. A point a illustrated in FIG. 1 denotes a ground, and a voltage at the ground is zero. A point b denotes a positive-electrode side of the solar photovoltaic panel 1. The first capacitor 4 is connected in parallel to between the positive and negative electrodes of the solar photovoltaic panel 1.

The first chopper circuit 5 is connected in parallel to the first capacitor 4. The first chopper circuit 5 includes first and second two switching elements 10 and 11 connected in series to each other, and diodes are connected in inverse parallel to the first and second switching elements 10 and 11. The first chopper circuit 5 including the first and second switching elements 10 and 11 constitutes a first switching circuit.

In the first chopper circuit 5, the first and second switching elements 10 and 11 are switched on and off in turns at a first frequency $f_1$ equal to a system frequency, for example, 50 Hz by a gate signal supplied from the control circuit 9. In a manner similar to switching elements 12-17 of the second and third chopper circuits 6 and 7, an N-channel MOSFET constitutes the respective first and second switching elements 10 and 11. The switching element is not necessarily limited to the MOSFET, and any of other switching elements, such as IGBT and transistor, may be used.

The second chopper circuit 6 includes a second capacitor 18 and a second switching circuit having serially connected third and fourth two switching elements 12 and 13 to which diodes are connected in reverse parallel. The second capacitor 18 and the second switching circuit are connected in parallel to each other. The third and fourth switching elements 12 and 13 are switched on and off in turns at a second frequency $f_2$ twice as high as the first frequency $f_1$, for example, 100 Hz, by a gate signal supplied from the control circuit 9.

One end side of the second chopper circuit 6 where the second capacitor 18 and the second switching circuit are connected in parallel is connected to a connecting portion where the first and second switching elements 10 and 11 are serially connected in the first chopper circuit 5. A point of the connection is shown with c. In the drawing, c and d are respectively on the sides of two capacitor electrodes of the second capacitor 18.

The third chopper circuit 7 includes a third switching circuit having serially connected fifth and sixth two switching elements 14 and 15 to which diodes are connected in reverse parallel, a third capacitor 19, and a fourth switching circuit having serially connected seventh and eighth two switching elements 16 and 17 to which diodes are connected in reverse parallel. In the third chopper circuit 7, the third switching circuit, third capacitor 19 and fourth switching circuit are connected in parallel to one another. One end side of the third chopper circuit 7 where these circuits are connected in parallel and the other end side thereof are shown with f and g in FIG. 1. f and g are respectively on the sides of two capacitor electrodes of the third capacitor 19.

The fifth and sixth switching elements 14 and 15 are switched on and off in turns at a third frequency $f_3$ three times as high as the first frequency for example, 150 Hz, by a gate signal supplied from the control circuit 9. The seventh and eighth switching elements 16 and 17 are PWM-controlled at a high frequency f4, for example, 18 kHz, by a gate signal supplied from the control circuit.

A connecting portion where the fifth and sixth switching elements 14 and 15 are serially connected in the third chopper circuit 7 is connected to a connecting portion where the third and fourth switching elements 12 and 13 are serially connected in the second chopper circuit 6. A point of the connection is shown with e in FIG. 1. The noise filter 8 including a reactor 20 and a fourth capacitor 21 is connected to a connecting portion where the seventh and eighth switching elements 16 and 17 are serially connected in the third chopper circuit 7. A point of the connection is shown with h in FIG. 1. A load not shown and the commercial power source 2 are connected to the noise filter 8.

The control circuit 9 measures a system voltage Vs and a system current Is by way of a differential amplifier circuit not shown and thereby calculates a command value V* as a sinusoidal target voltage synchronizing with the system frequency of the commercial power source 2 as in the conventional technology. The control circuit 9 further measures voltages Vd1, Vd2 and Vd3 at both ends of the first-third capacitors 4, 18 and 19 by way of the differential amplifier circuit not shown and thereby generates the gate signals for controlling the chopper circuits 5-7.

The voltage Vd1 is a direct current output voltage of the solar photovoltaic panel 1 detected at the point b with a voltage at the ground point a as a reference voltage. The voltage Vd2 is a charge voltage at the capacitor electrode point c of the second capacitor 18 of the second chopper circuit 6 with a voltage at the other capacitor electrode point d thereof as a reference voltage. The voltage Vd3 is a charge voltage at the capacitor electrode point g of the third capacitor 19 of the third chopper circuit 7 with a voltage at the other capacitor electrode point f thereof as a reference voltage.

Figure 2:
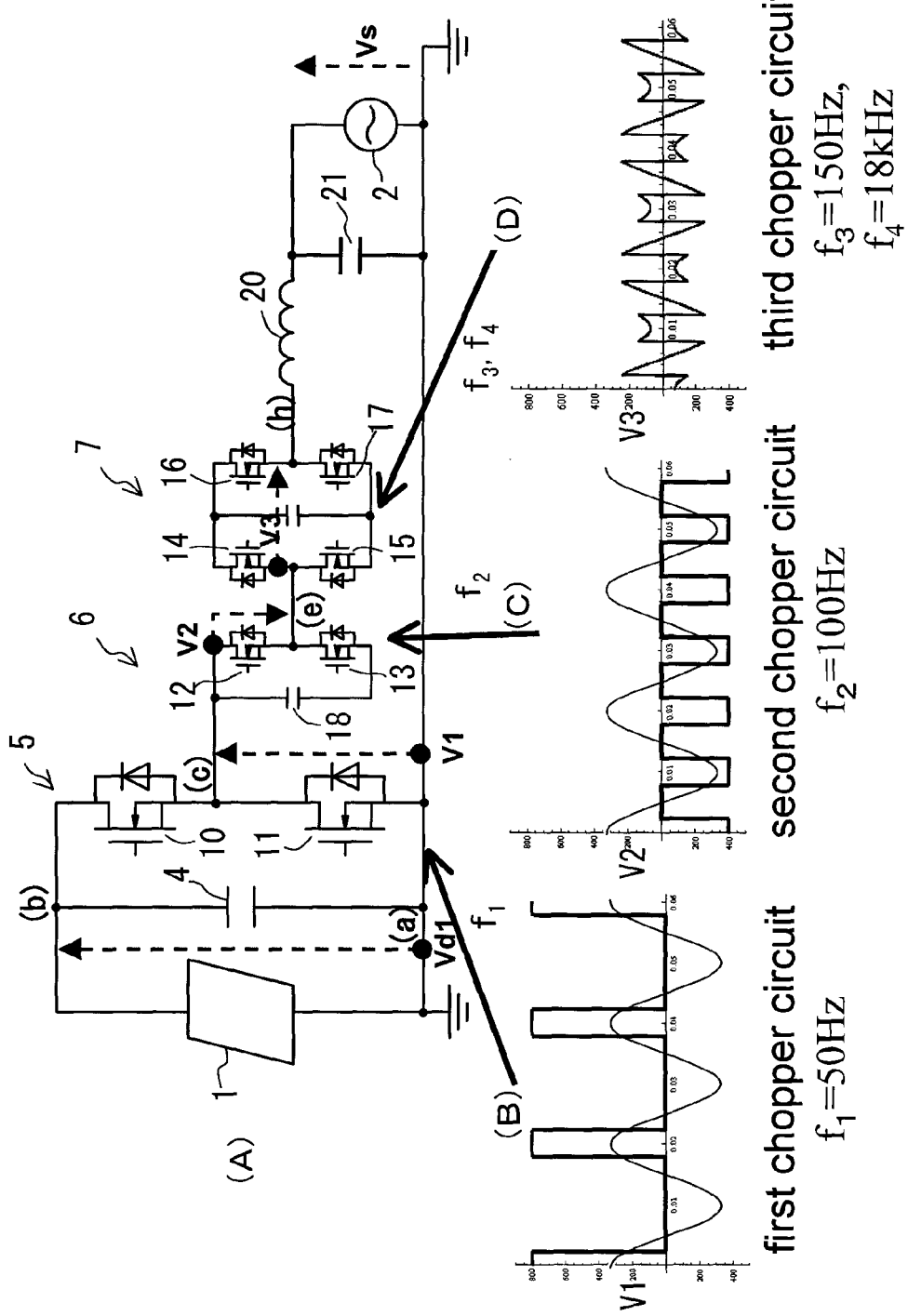
FIG. 2 is illustrations referred to in the description of an operation of a power conditioner illustrated in FIG. 1.

FIG. 2 is drawings schematically illustrating operations of the chopper circuits 5-7 according to the present preferred embodiment. (A) in FIG. 2 is an illustration of principal structural elements of FIG. 1, and (B)-(D) in FIG. 2 respectively illustrate voltages V1, V2 and V3 of (A) in FIG. 2. In (B) in FIG. 2 and (C) in FIG. 2, a waveform of the command value V* as the sinusoidal targeted voltage synchronizing with the system frequency is shown a thin solid line.

The voltage V1 is a voltage at the point c that is the connecting portion where the first and second switching elements 10 and 11 are serially connected in the first chopper circuit 5 with a potential at the ground point a as a first reference potential. The voltage V2 is a voltage at the point e that is the connecting portion where the third and fourth switching elements 12 and 13 are serially connected in the second chopper circuit 6 with a potential at the point c as a second reference potential. The voltage V3 is a voltage at the point h that is the connecting portion where the seventh and eighth switching elements 16 and 17 are serially connected in the third chopper circuit 7, wherein a potential at the point e, that is the connecting portion where the fifth and sixth switching elements 14 and 15 of the third chopper circuit 7 are serially connected, is used as a reference potential.

In the case of 50 Hz equal to the system frequency of the commercial power source 2, the switching elements 10 and 11 in the first chopper circuit 5 are switched on and off in turns at the first frequency f1, 50 Hz, equal to the system frequency. Accordingly, the voltage V1 at the point c, that is the connection portion where the first and second switching elements 10 and 11 are serially connected, results in a first sequence of square wave voltages including a plurality of square wave voltages that rises to the positive side with a voltage on the negative-electrode side of the solar photovoltaic panel 1 (zero voltage level) as a first reference voltage as illustrated in (B) in FIG. 2. The square wave voltage level of the voltage V1 is equal to the direct current output voltage Vd1 on the positive-electrode side of the solar photovoltaic panel 1.

In the second chopper circuit 6, the third and fourth switching elements 12 and 13 are switched on and off in turns at the second frequency $f_2$, 100 Hz, twice as high as the first frequency $f_1$. Accordingly, as illustrated in (C) in FIG. 2, the voltage V2 at the point e, that is the connecting portion where the third and fourth switching elements 12 and 13 are serially connected, results in a second sequence of square wave voltages including a plurality of square wave voltages that falls to the negative side with the point c where the first and second switching elements 10 and 11 are serially connected as a second benchmark. The square wave voltage level of the voltage V2 is controlled to be ½ of the direct current output voltage Vd1.

As illustrated in (D) in FIG. 4 described later, the voltage V2 at the point e, that is the connecting portion where the third and fourth switching elements 12 and 13 are serially connected in the second chopper circuit 6, is equal to the voltage V1+V2 (the sum of the voltage V1 in the points a-c and the voltage V2 in the points c-e) having a stepwise waveform that sinusoidally changes to the positive and negative sides in turns, in the case where the ground point a is used as a benchmark, in other words, the first referential potential is used as the reference potential. The voltage V1+V2 having the stepwise waveform changes to the positive and negative sides in turns in synchronization with the command value V* as the sinusoidal target value shown in (D) in FIG. 4 in a thin solid line.

In the third chopper circuit 7, the fifth and sixth switching elements 14 and 15 are switched on and off in turns at the third frequency $f_3$, 150 Hz, three times as high as the first frequency $f_1$ so that a voltage difference between the voltage V1+V2 having the stepwise waveform and the command value V* as the sinusoidal target voltage is compensated. The seventh and eighth switching elements 16 and 17 are PWM-controlled at the frequency f4, 18 kHz.

As a result, as illustrated in (D) in FIG. 2, the voltage V3 at the point h, that is the connecting portion where the seventh and eighth switching elements 16 and 17 are serially connected in the third chopper circuit 7 in (A) in FIG. 2, is equal to the voltage difference between the voltage V1+V2 having the stepwise waveform and the command value V* as the sinusoidal target voltage if indicated as a PWM mean value based on the point e that is the connecting portion where the fifth and sixth switching elements 14 and 15 are serially connected as a benchmark.

Therefore, the voltage V3 at the point h, that is the connecting portion where the seventh and eighth switching elements 16 and 17 are serially connected in the third chopper circuit 7, is equal to a sinusoidal wave voltage in accord with the command value V* as the target voltage synchronizing with the commercial power source 2 in the case where the first reference potential at the ground point a is used as the reference potential.

Figure 3:
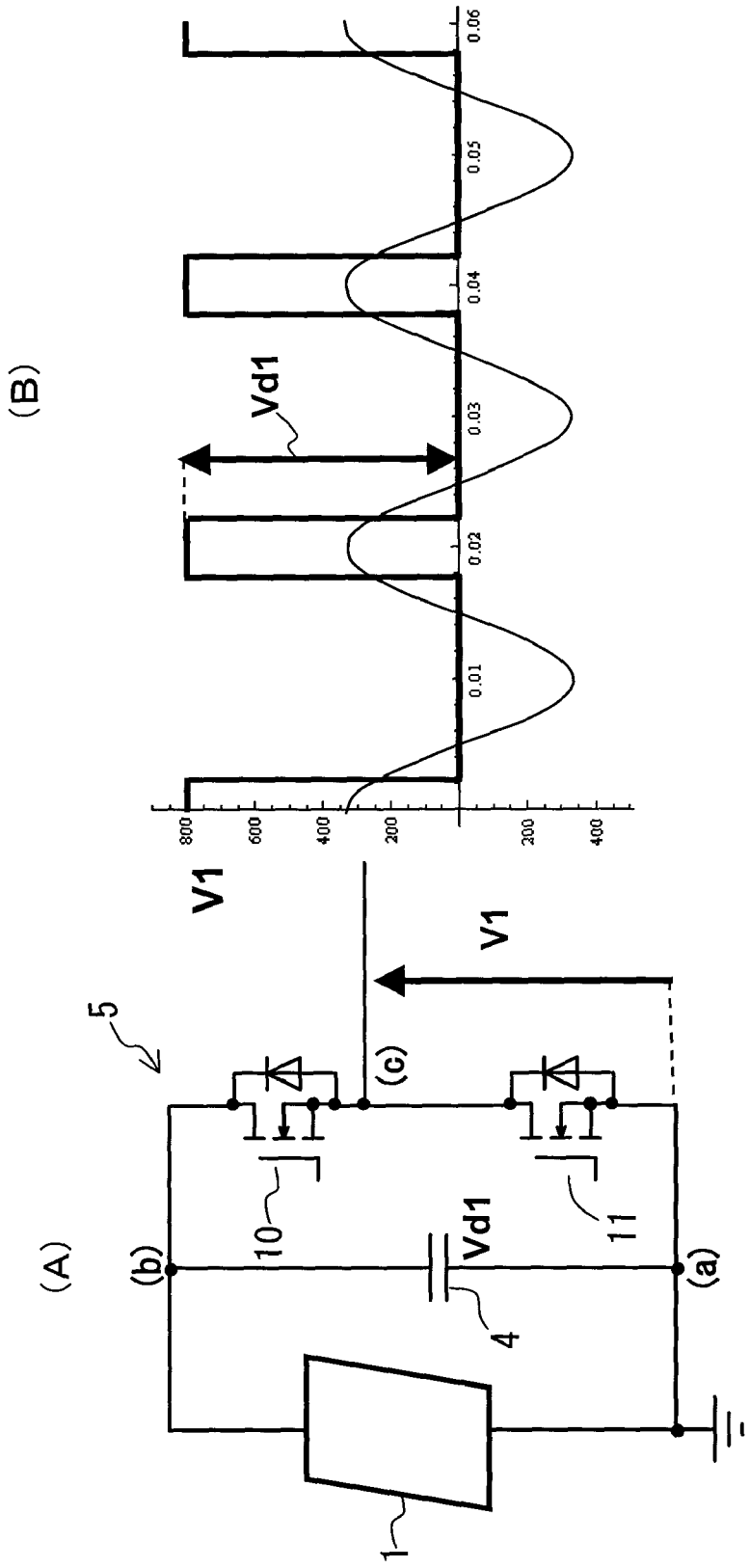
FIG. 3 is illustrations referred to in the description of a theory of operation of a first chopper circuit illustrated in FIG. 1.

The theory of the operation of each of the first-third chopper circuits 5-7 is described in further detail. FIG. 3 is drawings illustrating the theory of operation of the first chopper circuit 5. (A) in FIG. 3 illustrates the solar photovoltaic panel 1, first capacitor 4 and first chopper circuit 5. (B) in FIG. 3 illustrates the voltage V1 in the points a-c. In (B) in FIG. 3, the command value V* as the sinusoidal target voltage is shown in a thin solid line.

At the point b on the positive side of the solar photovoltaic panel 1 is detected the appearance of the direct current output voltage Vd1 of the solar photovoltaic panel 1 smoothed by the first capacitor 4 with a potential at the ground point a as the first reference potential.

In the first chopper circuit 5, the direct current output voltage Vd1 is chopped by the first and second switching elements 10 and 11 which are switched on and off in turns at the first frequency $f_1$, 50 Hz. When the first switching element 10 is switched on and the second switching element 11 is switched off, the charge voltage Vd1 of the first capacitor 4, that is the voltage at the point b, appears at the point c that is the connecting portion where the first and second switching elements 10 and 11 are serially connected in the first chopper circuit 5.

When the first switching element 10 is switched off and the second switching element 11 is switched on, the ground voltage Vd1 at the point a appears at the point c that is the connecting portion where the first and second switching elements 10 and 11 are serially connected in the first chopper circuit 5.

Therefore, as illustrated in (B) in FIG. 3, the voltage V1 at the point c, that is the connecting portion where the first and second switching elements 10 and 11 are serially connected, results in the first sequence of square wave voltages including a plurality of square wave voltages that rises to the positive side with the ground potential as the first reference potential as described earlier. The voltage V1 is a voltage at the point c that is the connecting portion where the first and second switching elements 10 and 11 are serially connected with the point a on the negative-electrode side of the solar photovoltaic panel 1 as a benchmark. The square wave voltage level is equal to the direct current output voltage Vd1 of the solar photovoltaic panel 1, for example, 800 V.

The first chopper circuit 5, which generates the sequence of square wave voltages having a phase equal to that of the system voltage, can output an effective power.

Figure 4:
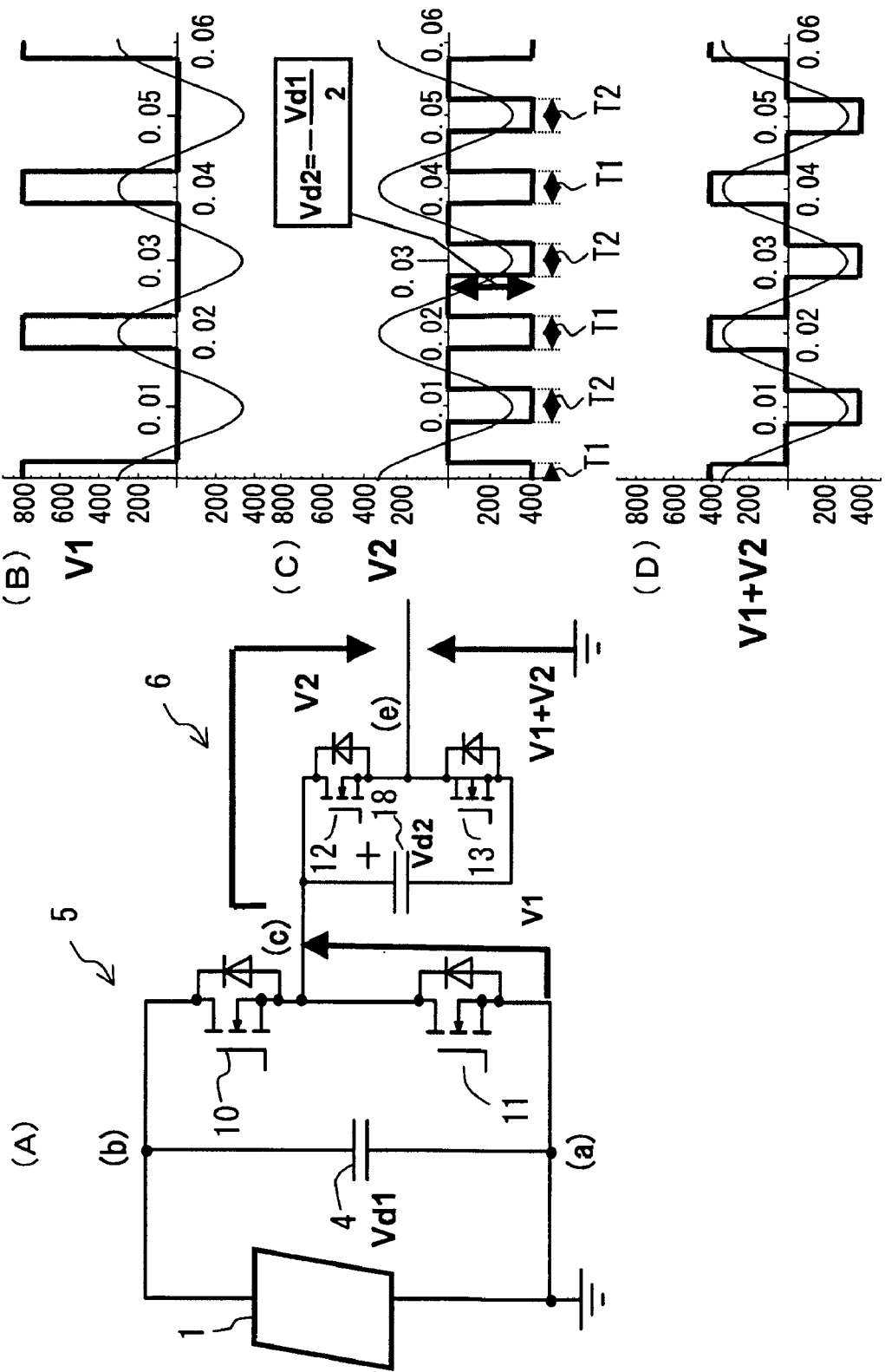
FIG. 4 is illustrations referred to in the description of a theory of operation of a second chopper circuit illustrated in FIG. 1.

FIG. 4 is a drawing referred to in the description of the theory of operation of the second chopper circuit 6. (A) in FIG. 4 illustrates the first chopper circuit 5 and the second chopper circuit 6, (B) in FIG. 4 illustrates the voltage V1, (C) in FIG. 4 illustrates the voltage V2, and (D) in FIG. 4 illustrates the voltage V1+V2. In (B)-(D) in FIG. 4, the command value V* as the sinusoidal target voltage is shown in a thin solid line.

In the second chopper circuit 6, the voltage V1 at the point c illustrated in (B) in FIG. 4 is chopped by the third and fourth switching elements 12 and 13 which are switched on and off in turns at the second frequency $f_2$, 100 Hz. When the third switching element 12 is switched on and the fourth switching element 13 is switched off, a potential at the point e, that is the connecting portion where the third and fourth switching elements 12 and 13 are serially connected, is equal to a potential at the point c that is the connecting portion where the first and second switching elements 10 and 11 are serially connected in the first chopper circuit 5. When the third switching element 12 is switched off and the fourth switching element 13 is switched on, the potential at the point e, that is the connecting portion where the third and fourth switching elements 12 and 13 are serially connected, is lower than the potential at the point c. Therefore, the voltage V2 at the point e, that is the connecting portion where the third and fourth switching elements 12 and 13 are serially connected, results in the second sequence of square wave voltages including a plurality of square wave voltages that falls to the negative side with a potential at the point c, that is the connecting portion where the first and second switching elements 10 and 11 are serially connected as the second reference potential as illustrated in (C) in FIG. 4.

When the first switching element 10 is switched on and the second switching element 11 is switched off in the first chopper circuit 5, and the third switching element 12 is switched off and the fourth switching element 13 is switched on in the second chopper circuit 6, the second capacitor 18 is charged. When the first switching element 10 is switched off and the second switching element 11 is switched on in the first chopper circuit 5, and the third switching element 12 is switched off and the fourth switching element 13 is switched on in the second chopper circuit 6, the charges stored in the second capacitor 18 are discharged via the switching elements 11 and 13 respectively switched on earlier. The second capacitor 18 is thus charged in charge periods T1 and discharged in discharge periods T2 in turns repeatedly as illustrated in (C) in FIG. 4, which generates the square wave voltage that falls to the negative side with the second reference potential at the point c as the reference potential. The square wave voltage level Vd2 is ½ of the direct current output voltage Vd1 of the solar photovoltaic panel 1 (Vd2=−Vd½), for example, 400 V.

The voltage V2 is a voltage at the point e that is the connection portion where the third and fourth switching elements 12 and 13 are serially connected with the point c that is the connection portion where the first and second switching elements 11 and 12 are serially connected as a benchmark. In the second chopper circuit 6, therefore, at the point e is detected the appearance of the voltage V1+V2 (the sum of the voltage V1 in the points a-c in (B) in FIG. 4 and the voltage V2 in the points c-e in (C) in FIG. 4 having the stepwise waveform that changes to the positive and negative sides in turns in response to the changes of the command value V* as the sinusoidal target voltage illustrated in (D) in FIG. 4 with the potential at the point a on the negative-electrode side of the solar photovoltaic panel 1 as the first reference potential. In the second chopper circuit 6, even-order harmonics can be removed because the sequence of square wave voltages that falls to the negative side is generated, and its theoretical effective power is zero since the charge and discharge are repeatedly performed using an equal power.

Figure 9:
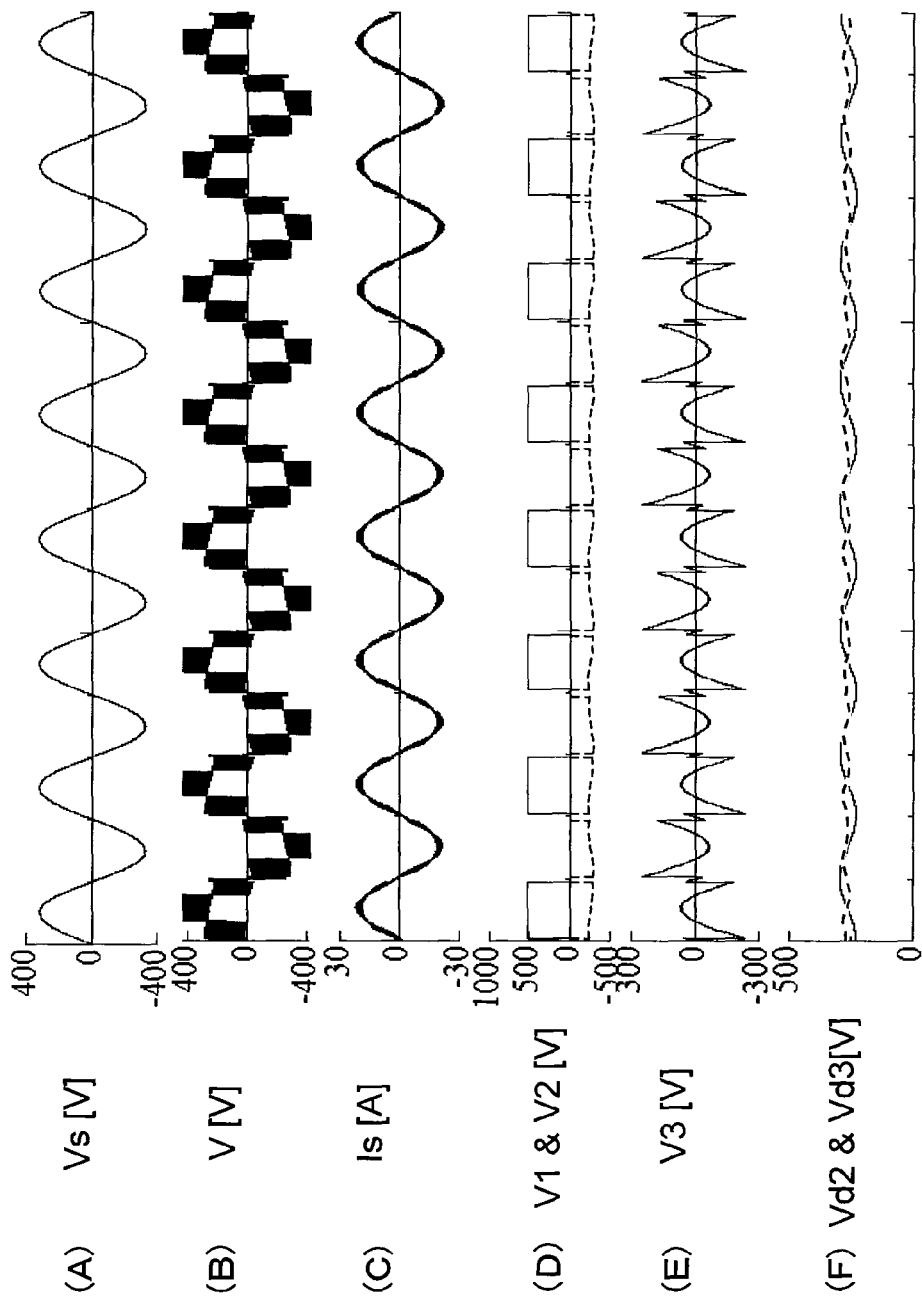
FIG. 9 is drawings illustrating voltage waveforms of the structural elements illustrated in FIG. 1.

The charge and discharge are enabled by the flow of the system current Is illustrated in (C) in FIG. 9, described later, in the second capacitor 18. When the system current Is illustrated in (C) in FIG. 9 is positive, the second capacitor 18 is charged with a sinusoidal wave current in the T1 periods illustrated in (C) in FIG. 4. Therefore, V2 progressively decreases in the T1 periods in practice. When the system current Is illustrated in (C) in FIG. 9 is negative, the sinusoidal wave current is discharged from the second capacitor 18 in the T2 periods illustrated in (C) in FIG. 4. Therefore, V2 progressively increases in practice.

Figure 6:
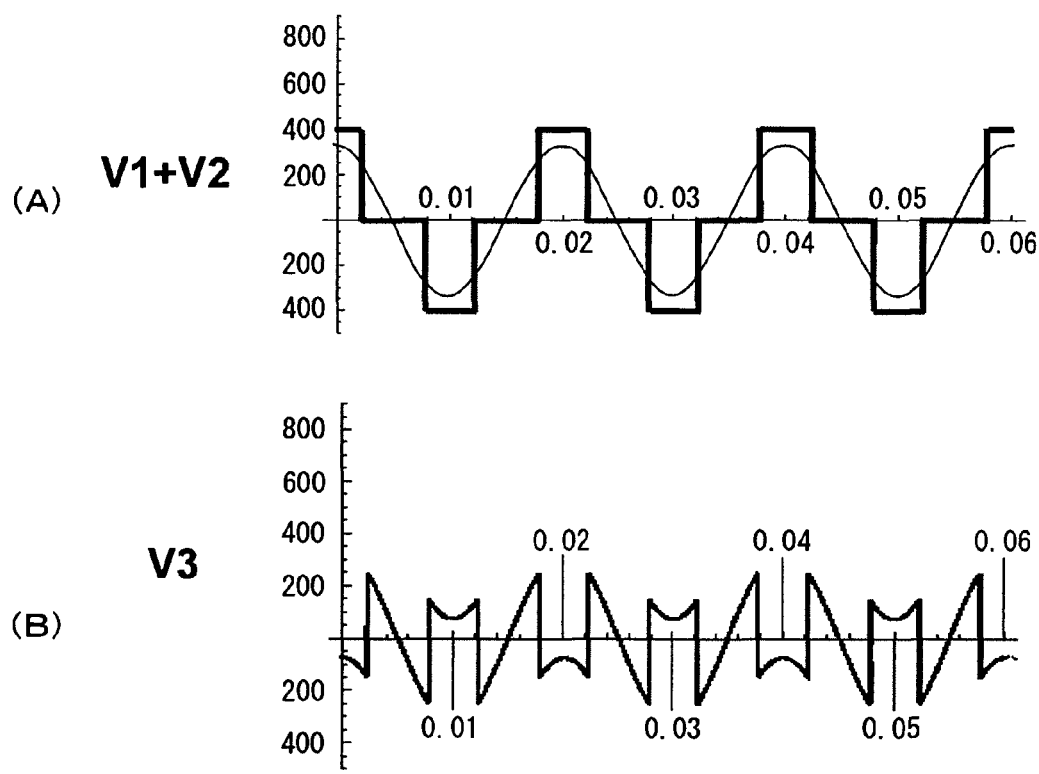
FIG. 6 is drawings illustrating voltage waveforms of structural elements illustrated in FIG. 5.

FIG. 5 is a drawing referred to in the description of the theory of operation of the third chopper circuit 7. (A) in FIG. 6 illustrates the voltage V1+V2 having the stepwise waveform, (B) in FIG. 6 illustrates an PWM mean value of the voltage V3 at the point h that is the connecting portion where the seventh and eighth switching elements 16 and 17 are serially connected with the point e, that is the connecting portion where the fifth and sixth switching elements 14 and 15 are serially connected, as a benchmark. In (A) in FIG. 6, the command value V* as the sinusoidal target voltage is shown in a thin solid line.

The fifth and sixth switching elements 14 and 15 are switched on and off by a timing that depends on if the voltage difference between the voltage V1+V2 having the stepwise waveform at the point e illustrated in (A) in FIG. 6 and the command value V* as the sinusoidal target voltage results in a positive value or a negative value. As a result, the voltage V1+V2 is supplied to and discharged from the third capacitor 19 by the on/off control timing.

In other words, the different voltage shows a positive value as far as the relational expression, voltage V1+V2>command value V* as the sinusoidal target voltage is satisfied, and the fifth switching element 14 is switched on and the sixth switching element 15 is switched off. As a result, the third capacitor 19 is charged with the voltage V1+V2.

The different voltage shows a negative value as far as the relational expression, voltage V1+V2<command value V* as the sinusoidal target voltage is satisfied, and the fifth switching element 14 is switched off and the sixth switching element 15 is switched on. As a result, the voltage charged in the third capacitor 19 is discharged therefrom.

The value of the voltage difference changes by the cycle of 150 Hz, that is the third frequency $f_3$, therefore, the fifth and sixth switching elements 14 and 15 are switched on and off in turns at the third frequency $f_3$.

In the third chopper circuit 7, the seventh and eighth switching elements 16 and 17 are PWM-controlled at a fourth frequency $f_4$, 18 kHz, which is a few hundred times as high as the first frequency $f_1$, based on such a duty that corrects the voltage difference between the voltage V1+V2 and the command value V* as the sinusoidal target voltage. Accordingly, the voltage V3 corresponding to the voltage difference between the voltage V1+V2 having the stepwise waveform and the command value V* as the sinusoidal target voltage appears at the point h that is the connecting portion where the seventh and eighth switching elements 16 and 17 are serially connected as illustrated in (B) in FIG. 6. The voltage V3, representing a PWM average value, is a voltage at the point h that is the connecting portion where the seventh and eighth switching elements 16 and 17 are serially connected with the point e, that is the connecting portion where the fifth and sixth switching elements 14 and 15 are serially connected, as a benchmark.

In the third chopper circuit 7, therefore, at the point h, that is the connecting portion where the seventh and eighth switching elements 16 and 17 are serially connected, is detected the appearance of the command value V* as the sinusoidal target value having a phase in accord with the variation of the power system frequency shown in the thin solid line in (A) in FIG. 6 (the sum of the voltage V1+V2 in the points a-e illustrated in (A) in FIG. 6 and the voltage V3 in points e-h illustrated in (B) in FIG. 6) with the ground point a on the negative-electrode side of the solar photovoltaic panel 1 as a benchmark.

In the third chopper circuit 7, third-order or higher harmonics can be controlled because the frequency three times as high as the system frequency is used as the chopping frequency, and no voltage difference to the sinusoidal wave voltage is generated.

Below is given a more detailed description of the control of the chopping operations in the chopper circuits 5-7 by the control circuit 9 illustrated in FIG. 1. The control circuit 9 controls pulse widths of the plurality of square wave voltages that rise to the positive side illustrated in (B) in FIG. 3 using the gate signals for the first and second switching elements 10 and 11 of the first chopper circuit 5. More specifically, the control circuit 9 controls the square wave voltages so that a fundamental component of the output voltage of the first chopper circuit 5 is equal to a fundamental component of the system power source, more specifically, so that a pulse width $\delta$ of the square wave voltage results in a value calculated by the following expression.

$$\delta = \sin^{-1}\{(\sqrt{2}\pi V)/(2Vd1)\}$$

V in the expression denotes an effective value of the voltage Vs of the system power source.

When the pulse width $\delta$ is adjusted by $\Delta\delta_1$, the fundamental voltage can be increased or decreased. The $\Delta\delta_1$ is calculated by multiplying an error between the measured voltage Vd3 and its target value Vd3* by a coefficient.

The control circuit 9 controls the voltage Vd2 illustrated in (C) in FIG. 4 to be reduced to ½ of the voltage Vd1 of the first chopper circuit 5 using the gate signals for the third and fourth switching elements 12 and 13 of the second chopper circuit 6. When the third and fourth switching elements 12 and 13 of the second chopper circuit 6 are switched on and off by the gate signals, the voltage is supplied to and discharged from the second capacitor 18 repeatedly as described earlier, and a plurality of sequences of square wave voltages that fall to the negative side illustrated in (C) in FIG. 4 are generated. The pulse width of the square wave to be charged in the charge periods T1 is equal to the pulse width of the square wave outputted from the first chopper circuit 5 in the charge periods T1. The pulse width of the square wave to be discharged in the discharge periods T2 is obtained when the pulse width of the square wave to be charged is adjusted by $\Delta\delta_2$.

The $\Delta\delta_2$ is calculated by multiplying an error between the measured voltage and its target voltage Vd2* by a coefficient. The target voltage Vd2* is ½ of the measured voltage Vd1. The control circuit 9 thus controls the pulse width of the square wave voltage in response to the variation of the power output from the solar photovoltaic panel 1.

Figure 7:
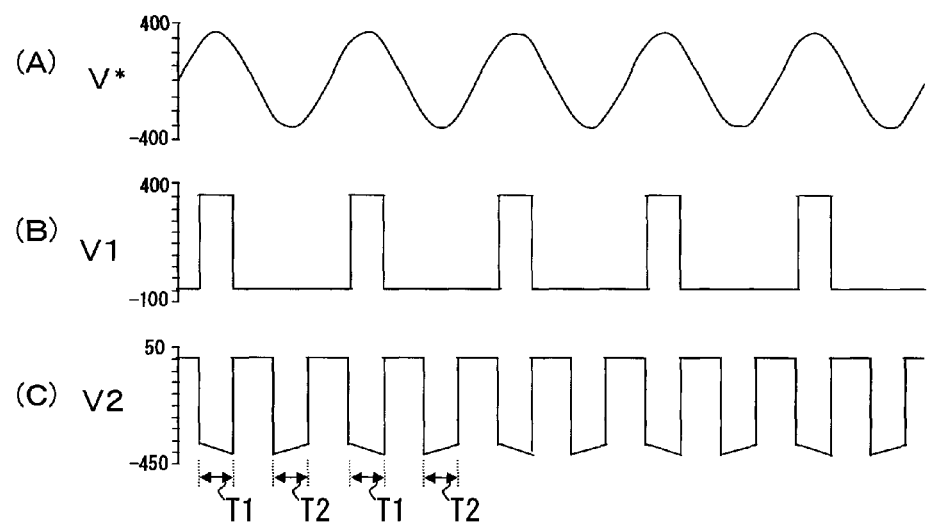
FIG. 7 is drawings illustrating voltages of the structural elements when an inputted voltage is 800 V.
Figure 8:
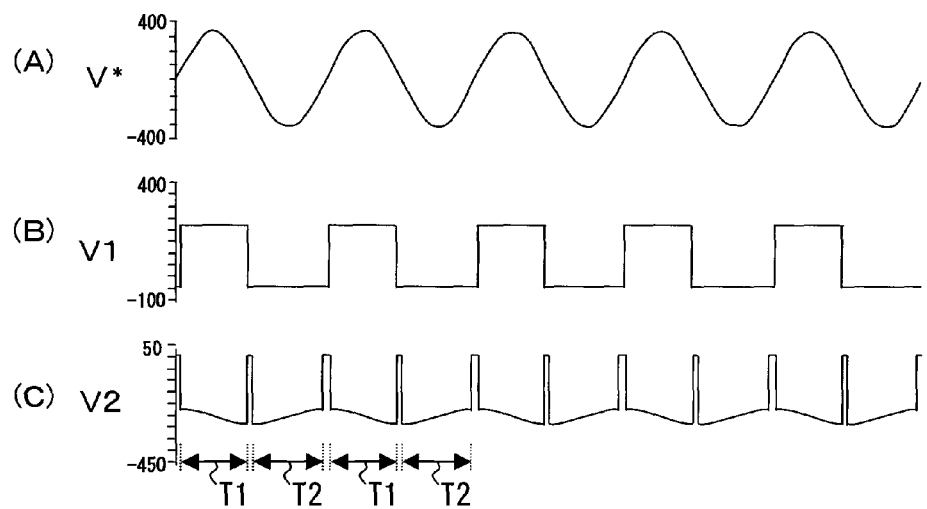
FIG. 8 is drawings illustrating voltages of the structural elements when the inputted voltage is 520 V.

FIGS. 7 and 8 illustrate simulated waveforms of the square wave voltages V1 and V2 on the positive and negative sides as the input voltage Vd1 from the solar photovoltaic panel 1 changes. The input voltage Vd1 is 800 V in FIG. 7, and the input voltage Vd1 is 520 V in FIG. 8.

(A) in FIG. 7 and (A) in FIG. 8 illustrate the command value V* as the sinusoidal target voltage. (B) in FIG. 7 and (B) in FIG. 8 illustrate the positive voltage V1 by the first chopper circuit 5. (C) in FIG. 7 and (C) in FIG. 8 illustrate the negative voltage V2 by the second chopper circuit 6.

It is known from the drawings that the pulse widths of the positive square waves illustrated in (B) in FIG. 8 and the negative square waves illustrated in (C) in FIG. 8 are both widened as the input voltage Vd1 is lower as compared with the illustrations in FIG. 7.

The control circuit 9 switches on and off the fifth and sixth switching elements 14 and 15 of the third chopper circuit 7 by the timing that depends on the voltage difference between the voltage V1+V2 having the stepwise waveform illustrated in (A) in FIG. 6 and the command value V* as the sinusoidal target voltage results in a positive value or a negative value. The control circuit 9 further PWM-controls the seventh and eighth switching elements 16 and 17 at a high frequency based on such a duty that corrects the voltage difference is corrected so that the sinusoidal wave voltage in accord with the command value V* as the target value is generated.

FIG. 9 illustrates simulated waveforms of the respective structural elements of FIG. 1, wherein the ground is used as a benchmark. (A) in FIG. 9 illustrates the system voltage Vs, (B) in FIG. 9 illustrates the output voltage V of the third chopper circuit 7, (C) in FIG. 9 illustrates the system current Is, (D) in FIG. 9 illustrates the voltages V1 and V2 (broken line), (E) in FIG. 9 illustrates the voltage V3, and (F) in FIG. 9 illustrates the voltages Vd2 and Vd3 (broken line).

In the present preferred embodiment, the second chopper circuit 6 generates the minus voltage with the potential on the negative-electrode side of the solar photovoltaic panel 1 as the reference potential. The same reference potential is thus used for the direct current from the solar photovoltaic panel 1 and the converted alternating current, and the potential on the negative-electrode side of the solar photovoltaic panel 1 can be thereby set to the ground potential. Therefore, the potential on the negative-electrode side of the thin film solar cell can be equal to the ground potential according to the non-insulated type power conditioner excellent in conversion efficiency, which prevents possible degradation of the thin film solar fell made of amorphous silicon.

Another technical feature of the present preferred embodiment is that the first and second switching elements 10 and 11 of the first chopper circuit 5 switch on and off, for example, the voltage of 800 V at the first frequency $f_1$, 50 Hz, the third and fourth switching elements 12 and 13 of the second chopper circuit 6 switch on and off, for example, the voltage of 400 V at the second frequency $f_2$, 100 Hz, and the fifth and sixth switching elements 14 and 15 of the third chopper circuit 7 switch on and off, for example, the voltage of 260 V at the third frequency $f_3$, 150 Hz. Thus, these switching elements are switched on and off at the frequencies far below the PWM frequency of the PWM-control inverter in the conventional power conditioner.

The seventh and eighth switching elements 16 and 17 of the third chopper circuit 3 PWM-controls the voltage of about 260 V, which is the voltage difference between the voltage V1+V2 having the stepwise waveform and the command value V* as the sinusoidal target voltage, at such a high frequency as 18 kHz. The seventh and eighth switching elements 16 and 17 thus switch on and off such a low voltage than in the PWM-control inverter of the conventional power conditioner.

As described so far, the first-sixth switching elements 10-15 of the first-third chopper circuits 5-7 are switched on and off at the very low frequencies as compared with the conventional PWM control. Accordingly, switching loss can be lessened, and elements with less conduction loss or more inexpensive elements can be selected as the switching elements. Another technical advantage is that the voltage much lower than in the conventional PWM control is switched on and off by the seventh and eighth switching elements 16 and 17 in the third chopper circuit 3, which also reduces the switching loss. As a result, the power conversion efficiency of the power conditioner 3 can be improved as compared with the conventional non-insulated type power conditioner.

Figure 10:
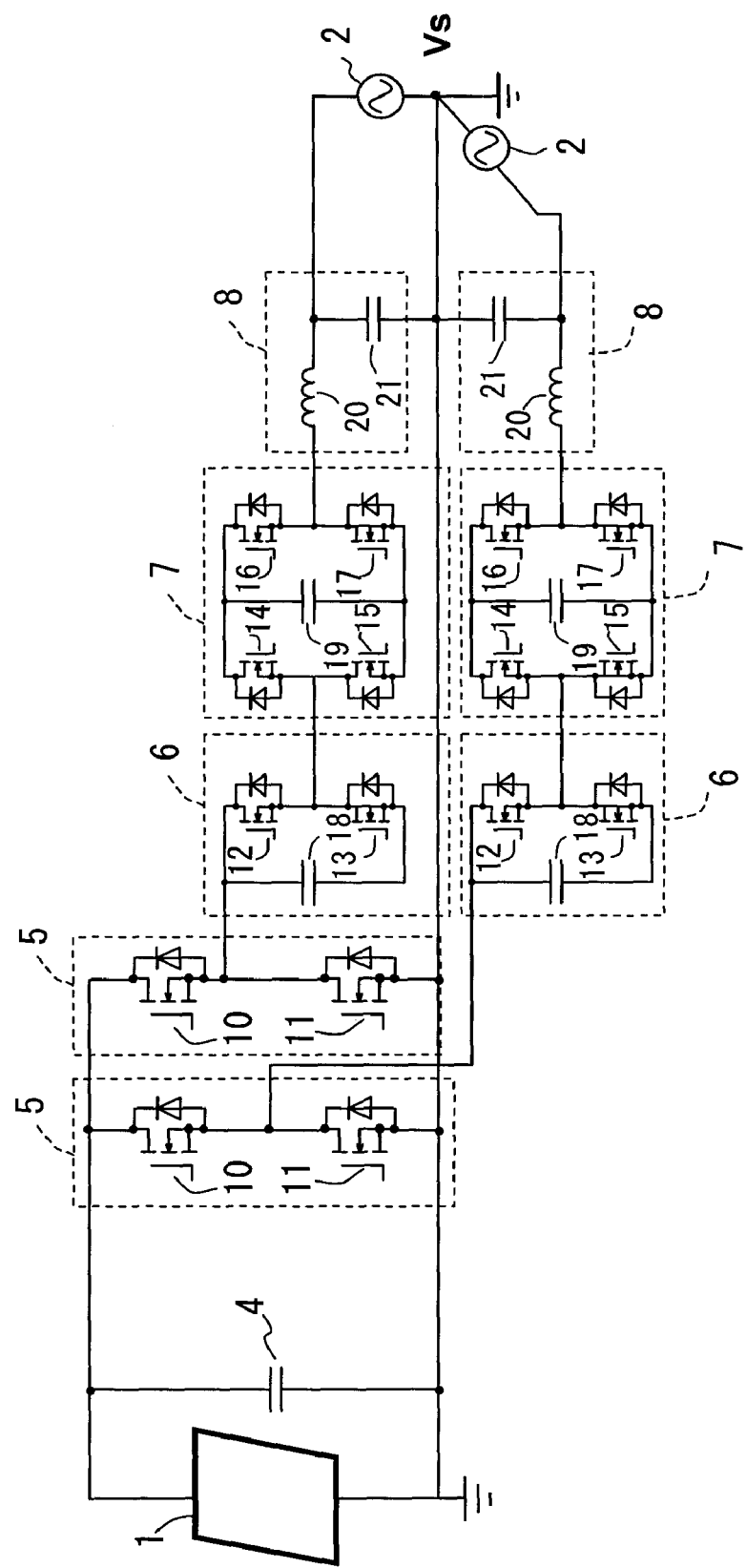
FIG. 10 is an illustration of a single-phase three-wire system.
Figure 11:
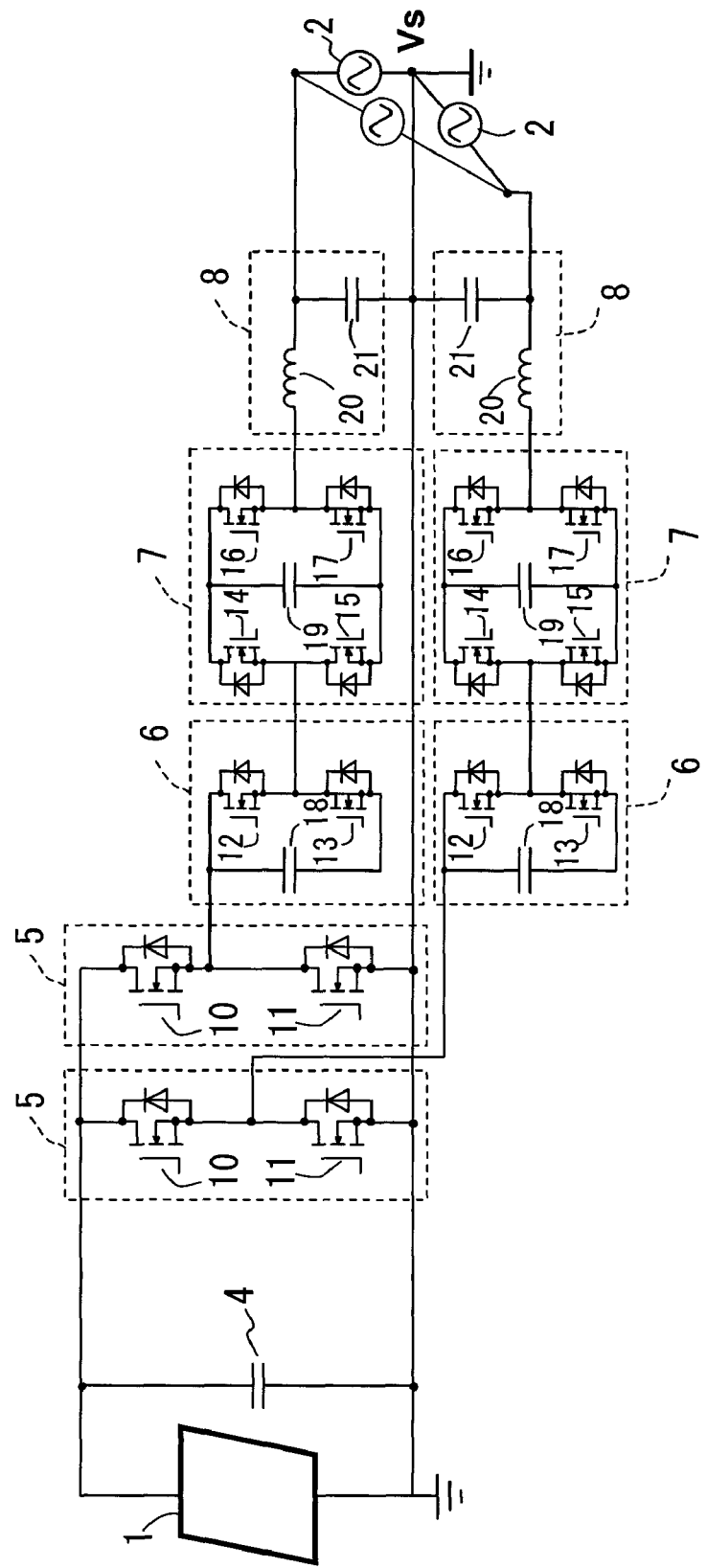
FIG. 11 is an illustration of a three-phase three-wire system.
Figure 12:
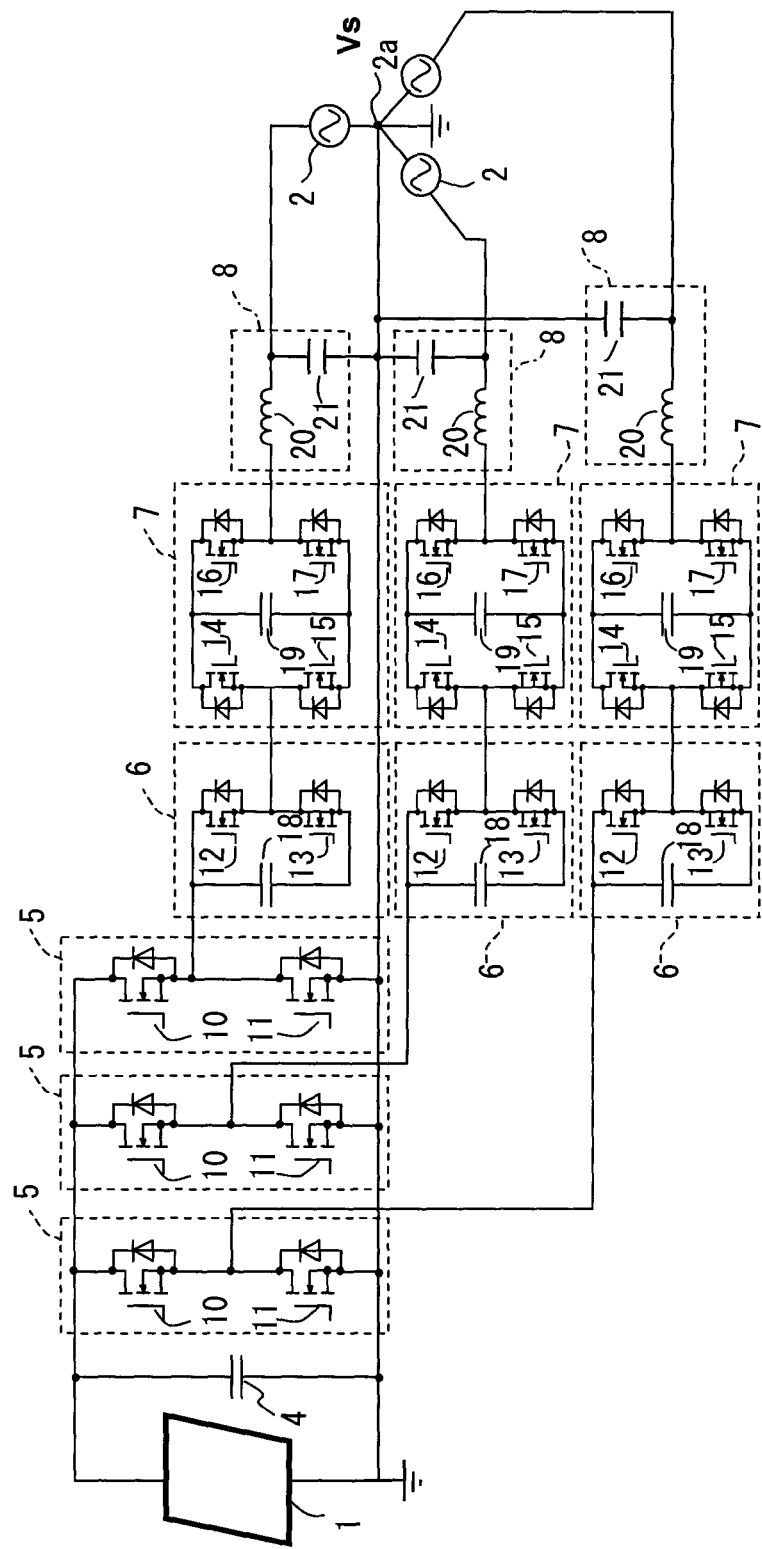
FIG. 12 is an illustration of a three-phase four-wire system.

The present preferred embodiment was described referring to the single-phase three-wire system. As different embodiments of the present invention, any of a single-phase three wire system illustrated in FIG. 10, a Y connection three-phase system illustrated in FIG. 11, and a delta connection three-phase system illustrated in FIG. 12 can be employed. In FIG. 12, the first-third chopper circuits 5-7 and the noise filter 8 are provided between the solar photovoltaic panel 1 and the phases of the Y connection three-phase commercial power source 2 where a neutral point 2a is grounded.

FIG. 13 illustrates comparison of the characteristics of the three-phase four-wire system illustrated in FIG. 5 according to the present preferred embodiment and the characteristics of the conventional system. A horizontal axis denotes the output voltage (W), and a vertical axis denotes the efficiency (%). In the drawing, solid lines denote the characteristics of the present preferred embodiment, wherein the bold solid line denotes the characteristics when SJ (super junction) MOS-FET is used as the switching element, the thin solid line denotes the characteristics when IGBT is used as the switching element. A broken line denotes the characteristics of the conventional system.

Figure 14:
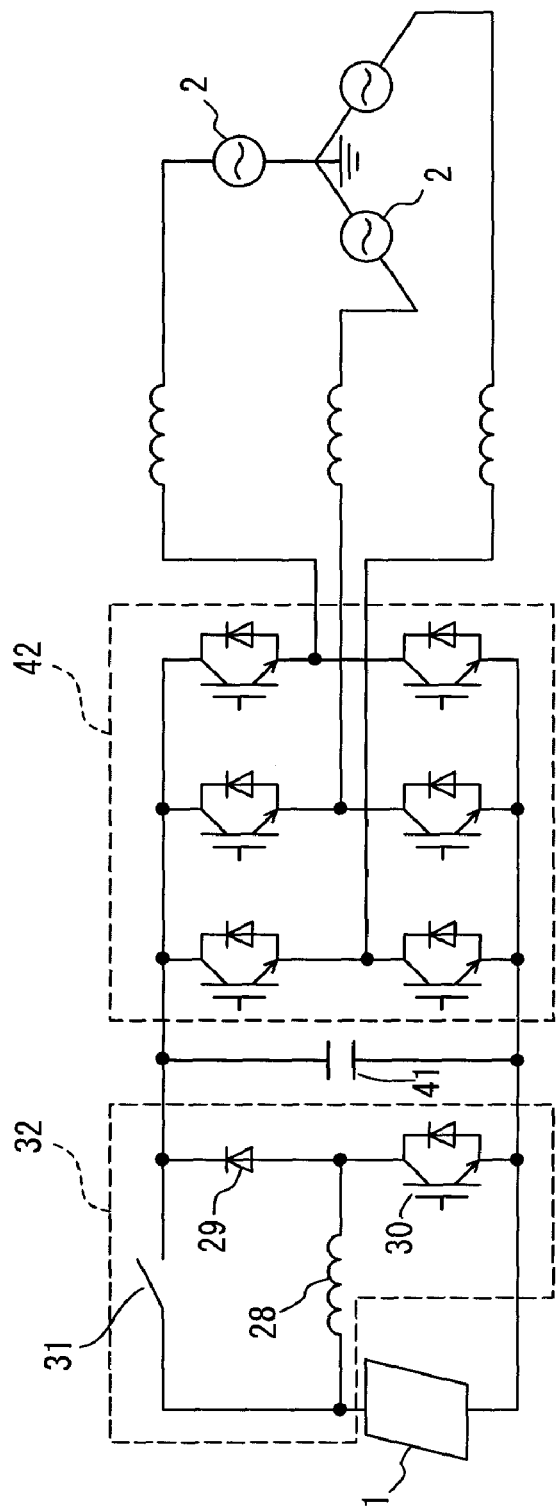
FIG. 14 is a drawing illustrating the conventional system illustrated in FIG. 13.
Figure 15:
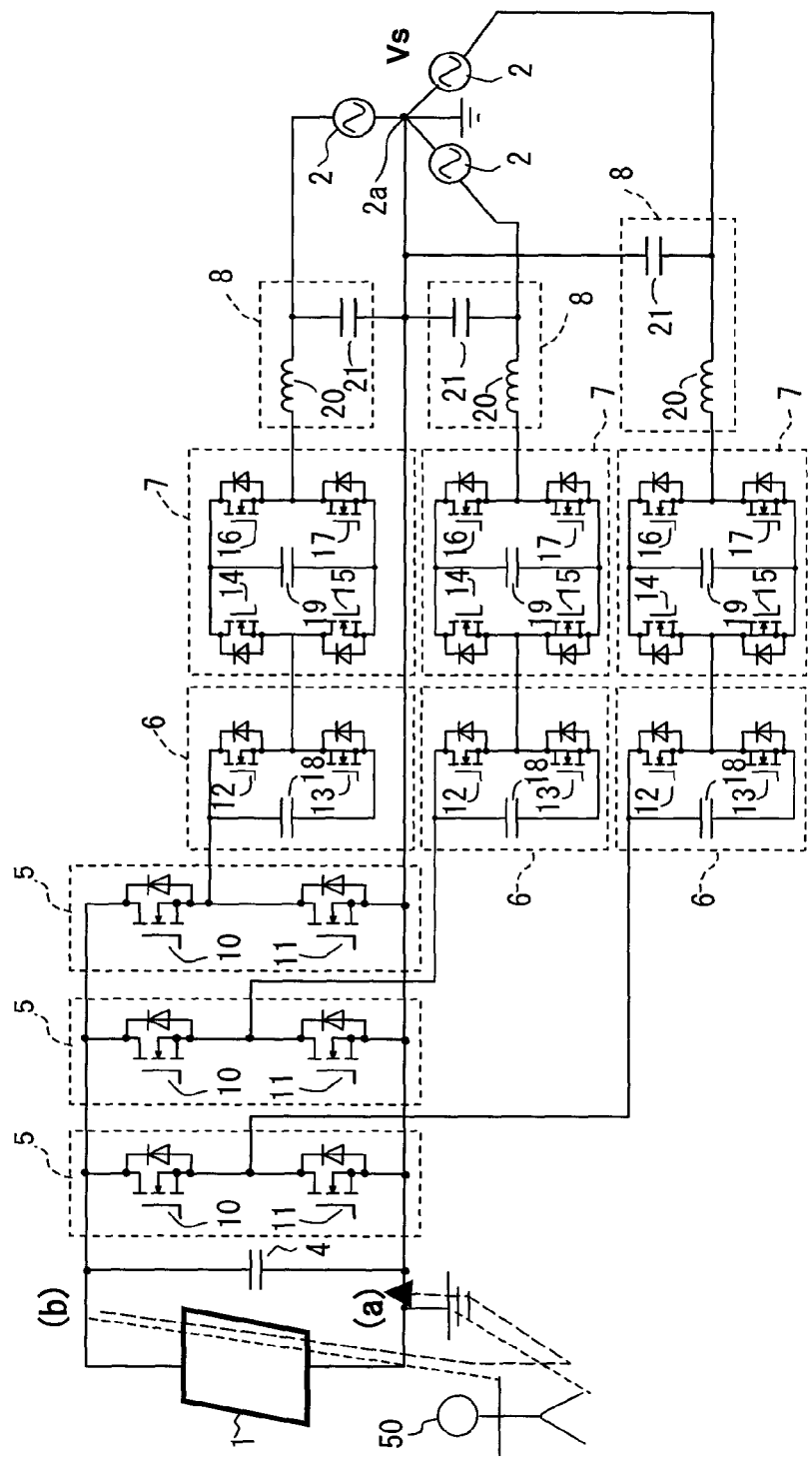
FIG. 15 is a drawing for illustrating the risk of an electrical shock for an operator.

In the example illustrated in FIG. 13, a line-to-line voltage of the system is 400 V, and the input voltage is 570 V. The conventional apparatus is a non-insulated type power conditioner, comprising a reactor 28, a diode 29, a booster circuit 32, a smoothing capacitor 41, and an inverter 42 for PWM control as illustrated in FIG. 14. The booster circuit 32 includes an IGBT 30 and a switch 31. It is known from the illustration of FIG. 13 that the efficiency is improved as compared with the conventional system.

In the preferred embodiment described so far, wherein the point a, that is the negative-electrode side of the solar photovoltaic 1 as the direct-current side, is grounded. Therefore, when an operator 50, for example, contacts the point a as the positive-electrode side of the direct current, he is thereby electrically shocked.

The non-insulated type power conditioner is provided with a ground fault detecting feature for detecting a ground fault and protectively shutdown electrical circuits. In the case where the negative-electrode side a of the photovoltaic panel 1 as the direct-current side and the neutral point 2a of the three-phase commercial power source 2 as the alternating-current side are both grounded, the ground fault current flows through a wiring as illustrated with a solid-line arrow A, while the ground fault current also flows through the ground as illustrated in a broken-line arrow B. Therefore, the ground fault detecting feature, which is supposed to detect the ground fault current running through the wiring, cannot function well, thereby failing to protect the operator from the electrical shock.

To protect the operator from the electrical shock, therefore, it is necessary to provide a fuse in the ground area on the negative-electrode side of the solar photovoltaic panel 1 or protectively cover the positive-electrode side with an insulation member to prevent him from accidentally contacting the positive-electrode side.

Figure 17:
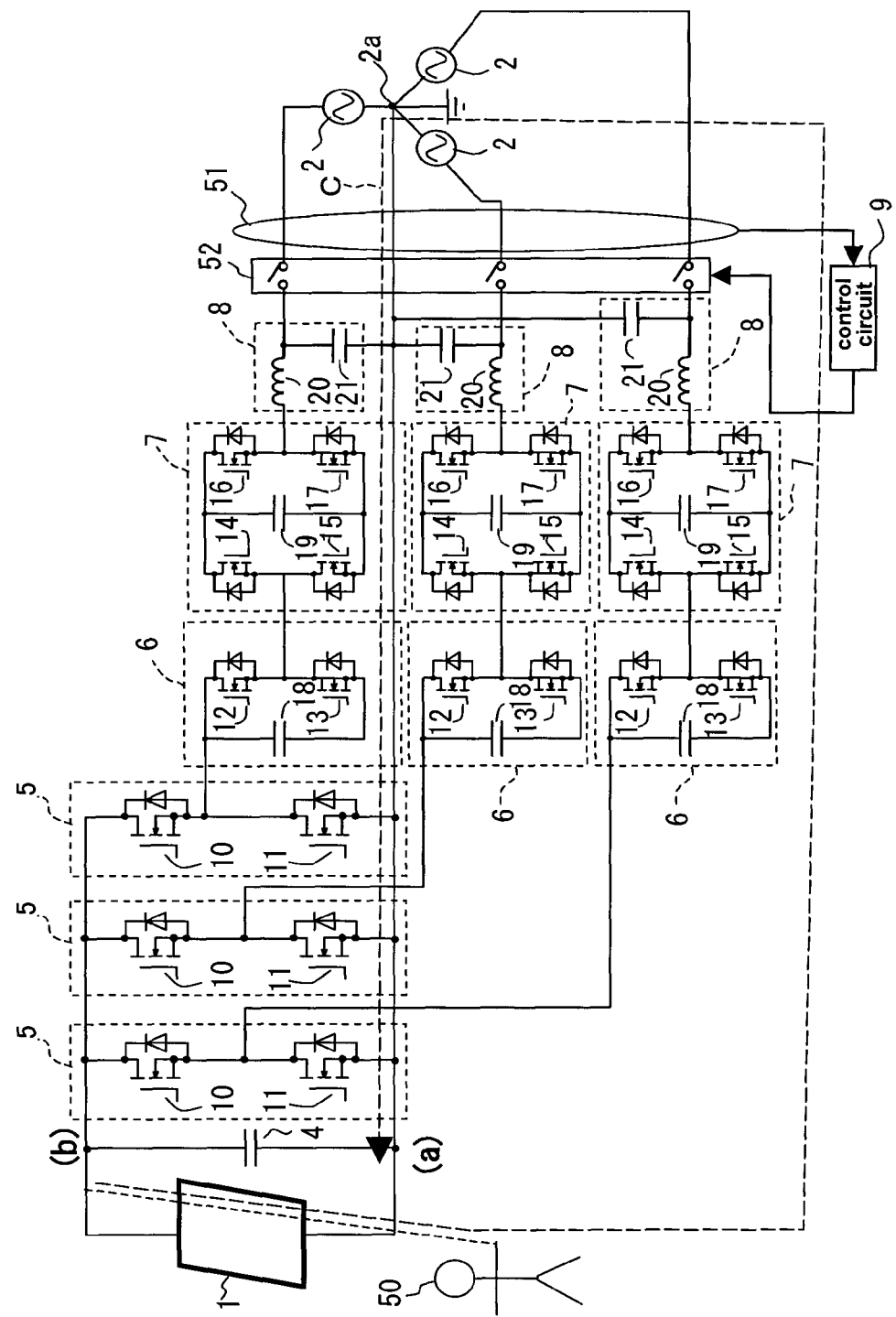
FIG. 17 is a drawing illustrating another preferred embodiment of the present invention.

FIG. 17 illustrates another preferred embodiment of the present invention, wherein any parts corresponding to those illustrated in FIG. 12 have the same reference symbols. In the another preferred embodiment, the negative-electrode side a of the solar photovoltaic panel 1 as the direct-current side is not directly grounded but is connected to the neutral point 2a of the Y connection three-phase commercial power source 2 as the alternating-current side to be thereby indirectly ground.

According to the another preferred embodiment, wherein the negative-electrode side of the solar photovoltaic panel 1 is not directly grounded, the operator 50, if accidentally contacts the positive-electrode side b on the direct-current side, can be protected by the ground fault detecting feature. More specifically, when the operator 50 accidentally contacts the positive-electrode side b on the direct-current side, the ground fault current illustrated with a broken-line arrow C is detected by a zero phase current transformer ZCT51 provided as an electrical leak detecting circuit. The control circuit 9 shuts down the electrical circuits by opening a relay 52 as a shutdown circuit based on a detection output of the ZCT51, and further stops the power conversion. Another advantage is to prevent the deterioration of the thin film solar cell by grounding the negative-electrode side a of the solar photovoltaic panel 1 via the neutral point 2*a* of the three-phase commercial power source 2 on the alternating-current side.

Figure 16:
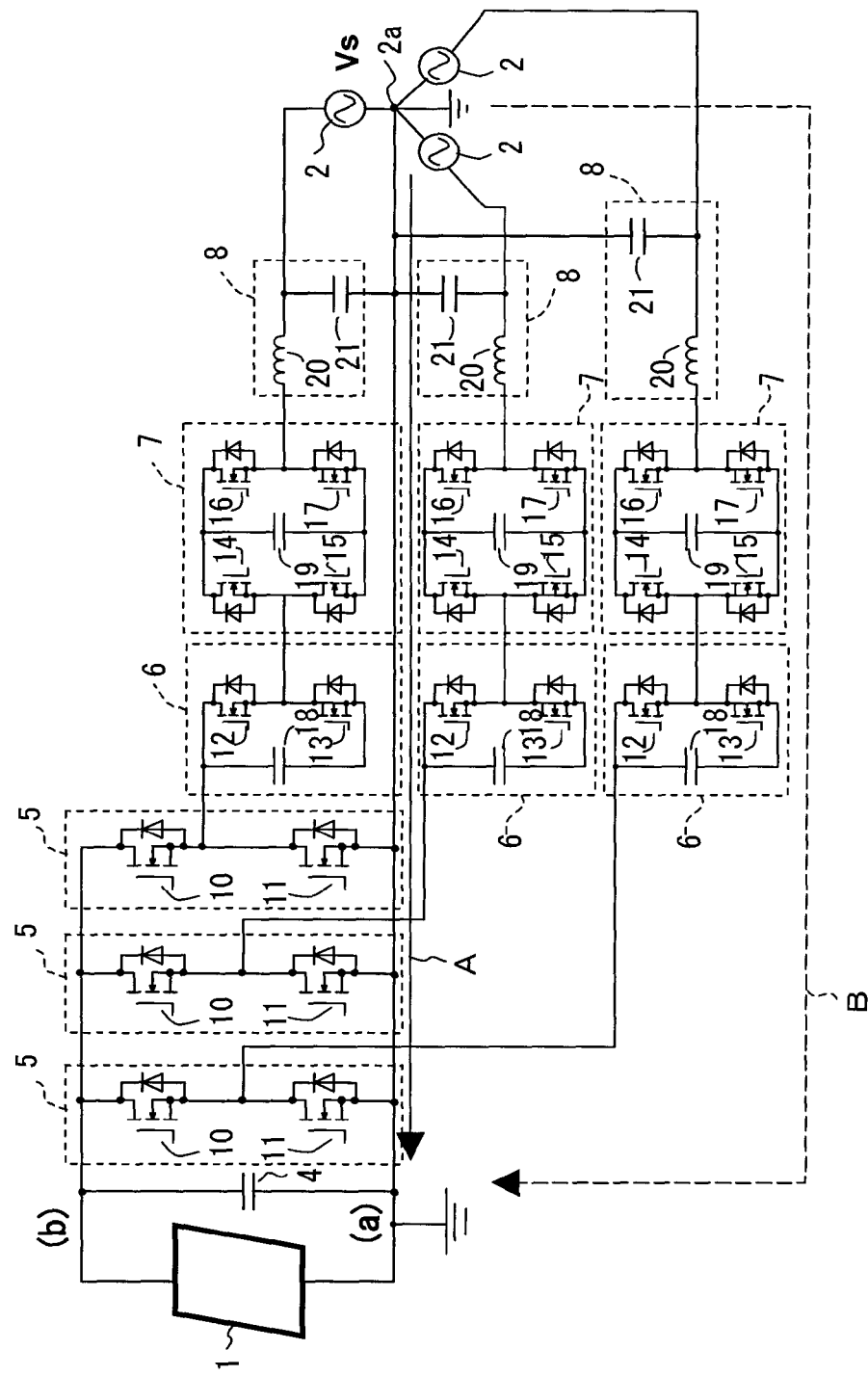
FIG. 16 is a drawing for describing a current flow when a negative-electrode side of a solar cell and a neutral point of a commercial power source are both grounded.
Figure 18:
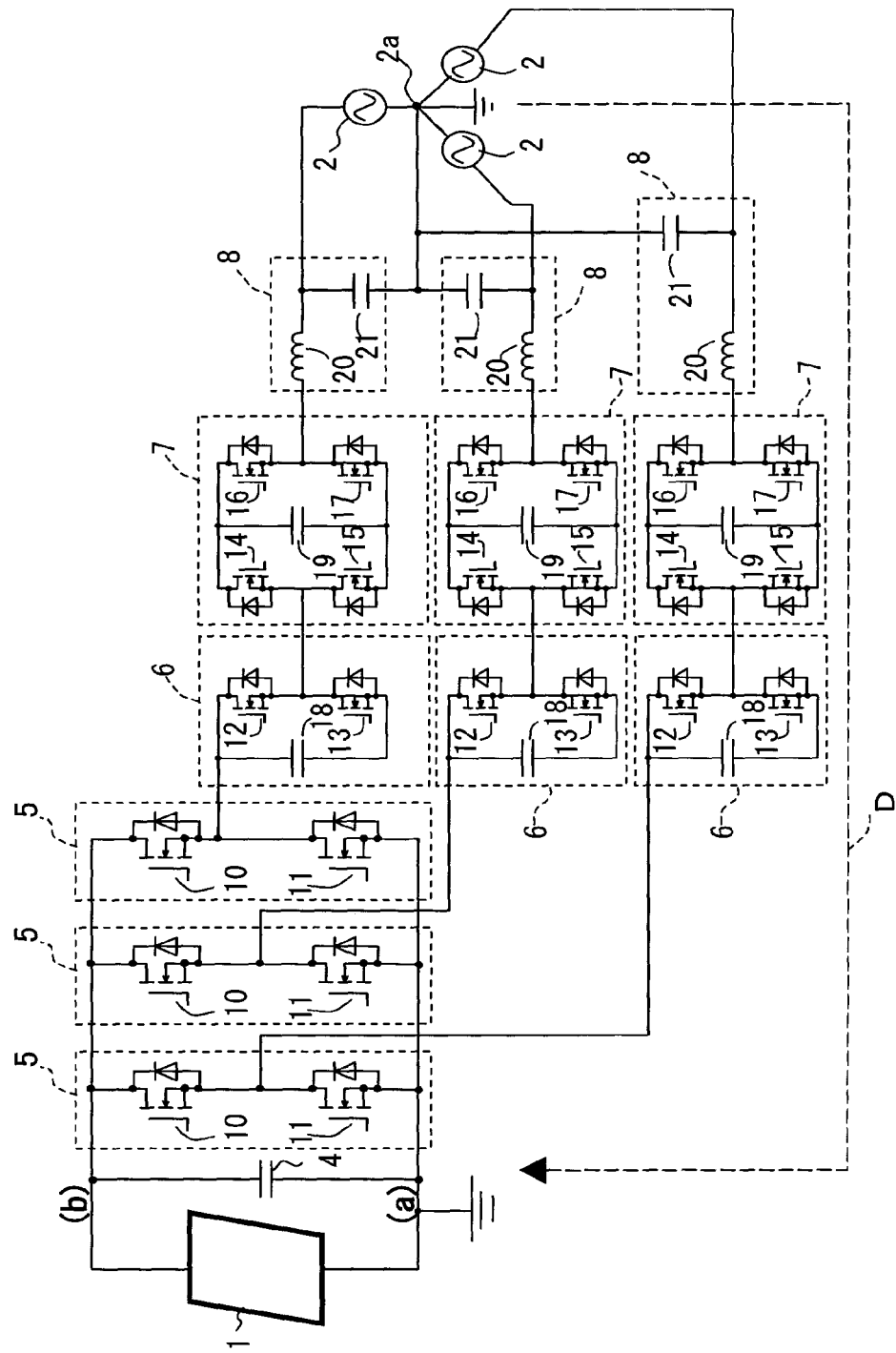
FIG. 18 is a drawing illustrating still another preferred embodiment of the present invention.
Figure 20:
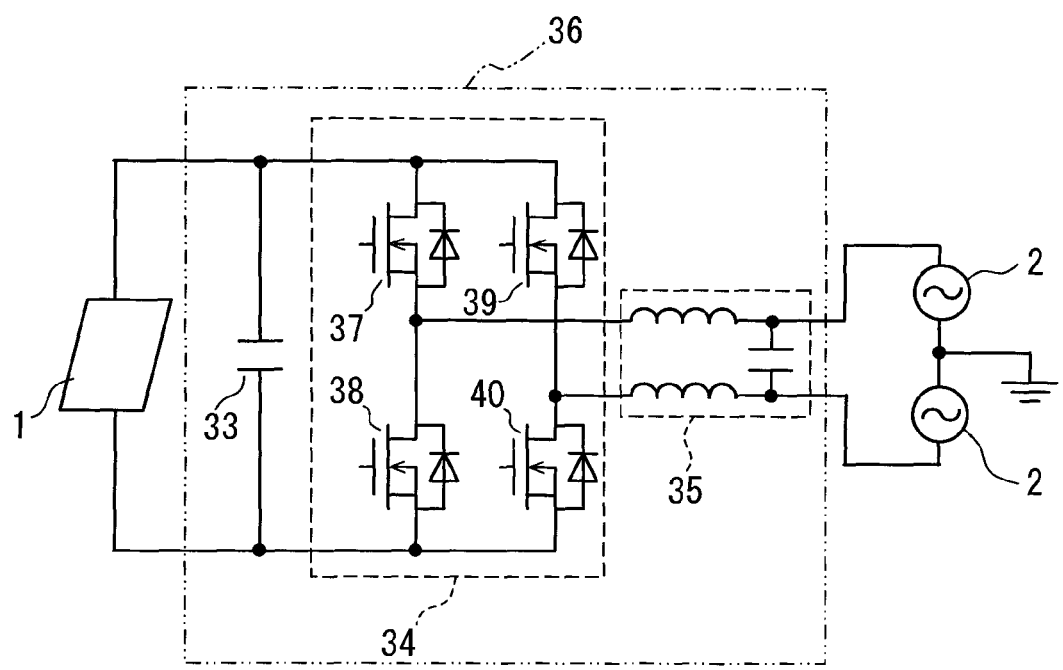
FIG. 20 is a drawing illustrating a conventional example.

FIG. 18 illustrates still another preferred embodiment of the present invention, wherein any parts corresponding to those illustrated in FIG. 12 have the same reference symbols. In the case where the negative-electrode side a of the photovoltaic panel 1 as the direct-current side and the neutral point 2*a* of the three-phase commercial power source 2 as the alternating-current side are both grounded as illustrated in FIG. 16, high harmonics, if generated at the neutral point 2*a* due to any voltage distortion on the system side, flow through the ground as illustrated with a broken-line arrow B and also flows inside the power conditioner as illustrated with a solid-line arrow A, which may result in breakage of the internal circuits.

To solve the problem, the present preferred embodiment is characterized in that the negative-electrode side a of the solar photovoltaic panel 1 as the direct-current side and the neutral point 2*a* of the three-phase commercial power source 2 as the alternating-current side are both ground, whereas they are not connected to each other as illustrated in FIG. 18. Accordingly, the high harmonics flow through the ground as illustrated with a broken-line arrow D, thereby preventing possible breakage of the internal circuits of the power conditioner.

FIG. 19 illustrates still another preferred embodiment of the present invention, wherein any parts corresponding to those illustrated in FIG. 12 have the same reference symbols. In the still another preferred embodiment, the negative-electrode side a of the solar photovoltaic panel 1 as the direct-current side is not grounded. Though not grounded, the voltage on the negative-electrode side a of the solar photovoltaic panel 1 as the direct-current side is substantially equal to the voltage at the neutral point 2*a* where the three phases of the commercial power source 2 are well balanced. As a result, the potential on the negative-electrode side a is substantially equal to the ground potential.

According to the still another preferred embodiment, wherein the negative-electrode side of the solar photovoltaic panel 1 is not grounded, the operator 50, if accidentally contacts the positive-electrode side b on the direct-current side, the ground fault current is detected by the zero phase current transformer ZCT51, and the control circuit 9 shuts down the electrical circuits by opening the relay 52 based on the detection output of the ZCT51, and further stops the power conversion. The operator can be thus protected by the ground fault detecting feature. The potential on the negative-electrode side of the solar photovoltaic panel 1 is substantially equal to the ground potential which is the potential at the neutral point 2*a* where the three phases of the commercial power source 2 are well balanced. As a result, possible deterioration of the thin film solar cell made of amorphous silicon constituting the solar photovoltaic panel 1 can be prevented. Further, the negative-electrode side a of the solar photovoltaic panel 1 as the direct-current side is not connected to the neutral point 2*a* of the three-phase commercial power source 2, which prevents the high harmonics from flowing in the internal circuits of the power conditioner. As a result, possible breakage of the internal circuits of the power conditioner can be avoided.

In the description of the preferred embodiments given so far, the solar cell is used as the direct current power source. The present invention is not necessarily limited to the solar cell but is applicable to other direct current power sources such as a fuel cell.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A non-insulated type power conditioner provided between a direct current power source and a commercial power source for converting a direct current input from the direct current power source into an alternating current output for utility interconnection with the commercial power source and outputting the converted alternating current output, comprising,
a circuit for retaining a potential on a negative-electrode side of the direct current output at a potential level equivalent to or higher than a ground potential of the alternating current output, wherein
the circuit comprises:
a first circuit for chopping a direct current voltage from the direct current power source at a first frequency as a system frequency and thereby generating a first sequence of square wave voltages including a plurality of square wave voltages having a voltage level that changes to a positive side relative to a first reference potential as a potential on the negative-electrode side of the direct current power source;
a second circuit for using a potential of the first sequence of square wave voltages as a second reference potential, the second circuit chopping an output of the first circuit at a second frequency of a predetermined number of times as high as the first frequency and thereby generating a second sequence of square wave voltages including a plurality of square wave voltages having a voltage level lower than the voltage level of the first sequence of square wave voltages on the positive side that changes to a negative side relative to the second reference potential, the second circuit further summing the first and second sequences of square wave voltages and thereby generating a third sequence of square wave voltages including a plurality of square wave voltages having a voltage level that changes to the positive and negative sides in turns in the manner of sinusoidal wave relative to the first reference potential; and
a third circuit for chopping the third sequence of square wave voltages at a third frequency determined by a timing that depends on if a voltage difference thereof to a sinusoidal wave voltage results in a positive value or a negative value and outputting the chopped third sequence of square wave voltages as a charge/discharge output, the third circuit further PWM-controlling the charge/discharge output at a PWM frequency higher than the third frequency so that the voltage difference between the third sequence of square wave voltages and the sinusoidal wave voltage is corrected and thereby generating a sinusoidal wave voltage that continuously changes to the positive and negative sides relative to the first reference potential using the third sequence of square wave voltages and the PWM-controlled output, and outputting the generated sinusoidal wave voltage to a load.

2. The power conditioner as claimed in claim 1, wherein the negative-electrode side of the direct current power source as a direct-current side is grounded.

3. The power conditioner as claimed in claim 1, wherein the commercial power source comprises a grounded wiring, and
the first circuit, the second circuit and the third circuit are disposed between the direct current input and the commercial power source.

4. The power conditioner as claimed in claim 3, wherein the commercial power source is a Y connection three-phase commercial power source where a neutral point is grounded,
the power conditioner converts the direct current input from the direct current power source into a three-phase alternating current power for utility interconnection with phases of the three-phase commercial power source, and outputs the converted three-phase alternating current power as the alternating current output, and
the negative-electrode side of the direct current power source as a direct-current side is connected to the neutral point of the Y connection three-phase commercial power source as an alternating current side to be grounded.

5. The power conditioner as claimed in claim 3, wherein the negative-electrode side of the direct current power source as a direct-current side is grounded.

6. The power conditioner as claimed in claim 1, wherein the commercial power source is a Y connection three-phase commercial power source where a neutral point is grounded,
the power conditioner converts the direct current input from the direct current power source into a three-phase alternating current power for utility interconnection with phases of the three-phase commercial power source, and outputs the converted three-phase alternating current power as the alternating current output,
the first circuit, the second circuit and the third circuit are provided between the direct current input and the Y connection three-phase commercial power source, and
the potential on the negative-electrode side of the direct current power source as a direct-current side is equal to a ground potential.

7. The power conditioner as claimed in claim 1, wherein
the first circuit includes a first switching circuit having first and second two switching elements connected in series to each other,
the first switching circuit is connected in parallel to a first capacitor connected to between positive and negative electrodes of the direct current power source,
the first and second switching elements are switched on and off in turns at the first frequency,
the second circuit includes a parallel connection circuit having a second capacitor and a second switching circuit,
one parallel connection side of the parallel connection circuit is connected to a connecting portion where the first and second switching elements are serially connected to each other,
the second switching circuit has third and fourth two switching elements connected in series to each other,
the third and fourth switching elements are switched on and off in turns at the second frequency,
the third circuit includes a parallel connection circuit having a third capacitor and a third switching circuit and a fourth switching circuit connected in parallel to the parallel connection circuit,
the third switching circuit has fifth and sixth two switching elements connected in series to each other,
a connecting portion where the fifth and sixth switching elements are serially connected to each other is connected to a connecting portion where the third and fourth switching elements are serially connected to each other,
the fifth and sixth switching elements are switched on and off in turns at the third frequency,
the fourth switching circuit has seventh and eighth two switching elements connected in series to each other, and
the seventh and eighth switching elements are PWM-controlled at the PWM frequency higher than the third frequency.

8. A solar photovoltaic power generation system comprising:
a thin film solar cell as the direct current power source; and
the power conditioner claimed in claim 2.

* * * * *